(12) United States Patent
Cho et al.

(10) Patent No.: US 12,487,756 B2
(45) Date of Patent: Dec. 2, 2025

(54) STORAGE DEVICE, OPERATION METHOD OF STORAGE DEVICE, AND OPERATION METHOD OF HOST DEVICE

(71) Applicant: Samsung Electronics Co., Ltd., Suwon-si (KR)

(72) Inventors: Hyunwoo Cho, Suwon-si (KR); Jungyoung Kim, Suwon-si (KR); Cholmin Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/534,192

(22) Filed: Dec. 8, 2023

(65) Prior Publication Data
US 2024/0311018 A1 Sep. 19, 2024

(30) Foreign Application Priority Data
Mar. 13, 2023 (KR) .................... 10-2023-0032722

(51) Int. Cl.
*G06F 3/06* (2006.01)
(52) U.S. Cl.
CPC .......... *G06F 3/0619* (2013.01); *G06F 3/0656* (2013.01); *G06F 3/0679* (2013.01)
(58) Field of Classification Search
CPC .... G06F 3/0619; G06F 3/0656; G06F 3/0679; G06F 3/0616; G06F 3/0604; G06F 3/0653; G06F 3/0658; G06F 2212/1016; G06F 2212/1036; G06F 2212/2022
See application file for complete search history.

(56) References Cited

U.S. PATENT DOCUMENTS

| | | | |
|---|---|---|---|
| 10,289,323 B2 | 5/2019 | Yang et al. | |
| 10,572,388 B2 | 2/2020 | Christensen et al. | |
| 11,016,545 B2 | 5/2021 | Yang et al. | |
| 11,334,248 B2 | 5/2022 | Byun | |
| 2013/0080679 A1 | 3/2013 | Bert | |
| 2016/0062421 A1 | 3/2016 | Sugawara et al. | |

(Continued)

FOREIGN PATENT DOCUMENTS

| | | |
|---|---|---|
| CN | 114442963 A | 5/2022 |
| KR | 102044610 B1 | 11/2019 |

OTHER PUBLICATIONS

Universal Flash Storageâ (Version 3.1, Jan. 2020 (Year: 2020).*
(Continued)

*Primary Examiner* — Masud K Khan
*Assistant Examiner* — Subir Kumar Chowdhury
(74) *Attorney, Agent, or Firm* — Harness, Dickey & Pierce, P.L.C.

(57) ABSTRACT

Disclosed is an operation method of a storage device which includes a write booster buffer and normal storage. The operation method includes writing first write data received from a host device in the write booster buffer, and selectively performing a flush operation on write booster buffer, in which the first write data stored in the write booster buffer are flushed to the normal storage, based on a device temperature of the storage device. Memory cells included in the write booster buffer are configured to store "n" bits (n being a natural number), and memory cells included in the normal storage are configured to store "m" bits (m being a natural number more than n).

18 Claims, 19 Drawing Sheets

(56) References Cited

U.S. PATENT DOCUMENTS

| | | | |
|---|---|---|---|
| 2017/0060425 A1* | 3/2017 | Sunata | G11C 16/10 |
| 2020/0409842 A1* | 12/2020 | Roh | G06F 12/0802 |
| 2021/0034513 A1* | 2/2021 | Kim | G06F 12/1491 |
| 2021/0132817 A1 | 5/2021 | Bhat et al. | |
| 2021/0173579 A1 | 6/2021 | Lin | |
| 2022/0189558 A1* | 6/2022 | Wu | G11C 7/04 |
| 2022/0253239 A1 | 8/2022 | Jang et al. | |

OTHER PUBLICATIONS

Universal Flash Storage (UFS) (Version 3.1, Jan. 2020) 2020.*
Universal Flash Storage (UFS) (Version 3.1, Jan. 2020) 2020 (Year: 2020).*
Universal Flash Storage (UFS) Version 3.1, JEDEC Solid State Technology Association, Jan. 2020.

* cited by examiner

FIG. 17B
FIG. 17C
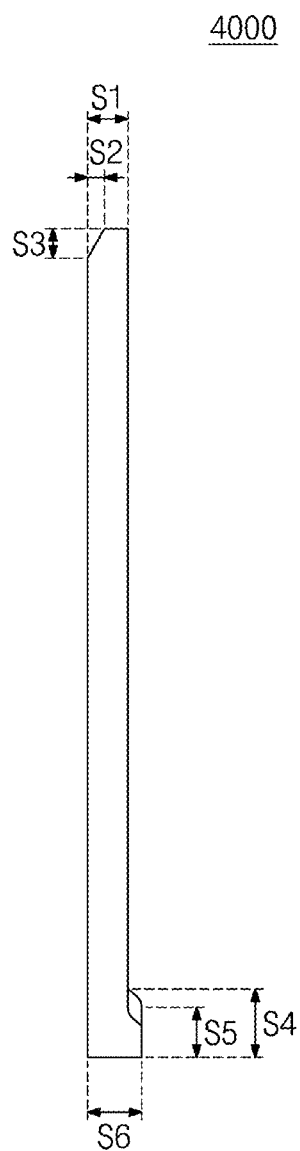
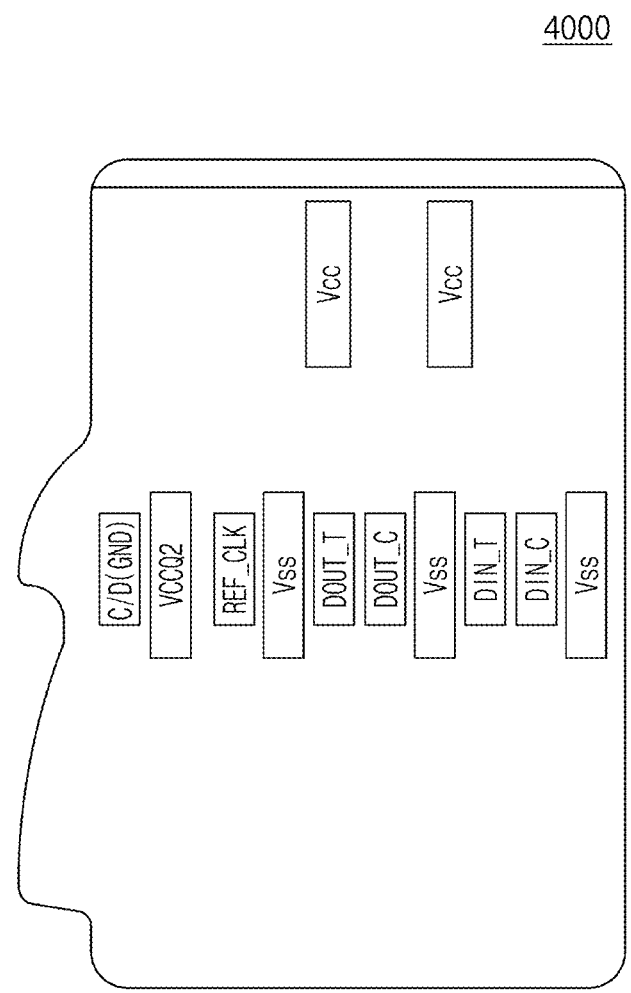

STORAGE DEVICE, OPERATION METHOD OF STORAGE DEVICE, AND OPERATION METHOD OF HOST DEVICE

CROSS-REFERENCE TO RELATED APPLICATIONS

This application claims priority under 35 U.S.C. § 119 to Korean Patent Application No. 10-2023-0032722 filed on Mar. 13, 2023, in the Korean Intellectual Property Office, the disclosures of which are incorporated herein by reference in their entireties.

BACKGROUND

The present inventive concepts relate to semiconductor memories, and more particularly, to storage devices, operation methods of the storage devices, and operation methods of host devices.

A semiconductor memory is classified as a volatile memory, which loses data stored therein when a power is turned off, such as a static random access memory (SRAM) or a dynamic random access memory (DRAM), or a semiconductor memory is classified as a nonvolatile memory, which retains data stored therein even when a power is turned off, such as a flash memory, a phase-change RAM (PRAM), a magnetic RAM (MRAM), a resistive RAM (RRAM), or a ferroelectric RAM (FRAM).

A flash memory device is being widely used as a high-capacity storage medium of a computing system. Nowadays, various technologies for supporting a high-speed operation of the flash memory device are being developed. As an example, a universal flash storage (UFS) interface defined by the JEDEC standard may support an improved operating speed compared to a conventional flash memory-based storage device.

SUMMARY

The present inventive concepts provide storage devices with an improved lifetime, operation methods of the storage devices, and operation methods of host devices.

According to some example embodiments, an operation method of a storage device which includes a write booster buffer and normal storage, the method comprising writing first write data received from a host device in the write booster buffer, and selectively performing a flush operation on the write booster buffer, in which the first write data stored in the write booster buffer are flushed to the normal storage, based on a device temperature of the storage device, wherein memory cells included in the write booster buffer are configured to store "n" bits, "n" being a natural number, and wherein memory cells included in the normal storage are configured to store "m" bits, "m" being a natural number greater than "n".

According to some example embodiments, a storage device comprising a nonvolatile memory device that includes a write booster buffer and normal storage, a storage controller that preferentially writes first write data received from a host device in the write booster buffer, and a temperature sensor that periodically measures a device temperature of the storage device, wherein memory cells included in the write booster buffer are configured to store "n" bits, "n" being a natural number, wherein memory cells included in the normal storage are configured to store "m" bits, "m" being a natural number more than "n", and wherein, when the device temperature is within a reference temperature range, the storage controller is further configured to write second write data received from the host device in the normal storage.

According to some example embodiments, an operation method of a host device which is configured to control a universal flash storage (UFS) device, the method comprising enabling a write booster of the UFS device, receiving a device temperature of the UFS device, and when the device temperature is within a reference temperature range, setting values of fields associated with a flush operation on write booster buffer of the UFS device to a first value corresponding to "disable".

BRIEF DESCRIPTION OF THE DRAWINGS

Example embodiments will be more clearly understood from the following detailed description taken in conjunction with the accompanying drawings in which.

FIGS. 17A to 17C are diagrams for describing a form factor of an UFS card according to some example embodiments.

DETAILED DESCRIPTION

Figure 1:
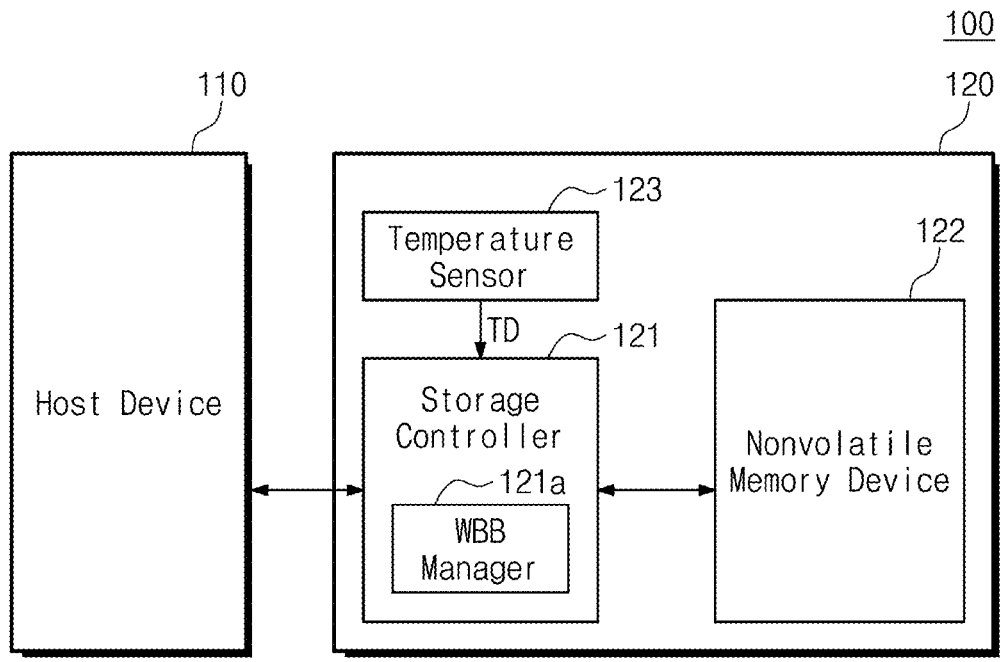
FIG. 1 is a block diagram illustrating a storage system according to some example embodiments.

The present inventive concepts will be described more fully hereinafter with reference to the accompanying drawings, in which some example embodiments of the present inventive concepts are shown. As those skilled in the art would realize, the described example embodiments may be modified in various different ways, all without departing from the spirit or scope of the present inventive concepts.

Accordingly, the drawings and description are to be regarded as illustrative in nature and not restrictive. Like reference numerals designate like elements throughout the specification. The sequence of operations or steps are not limited to the order presented in the claims or figures unless specifically indicated otherwise. The order of operations or steps may be changed, several operations or steps may be merged, a certain operation or step may be divided, and a specific operation or step may not be performed.

As used herein, the singular forms "a" and "an" are intended to include the plural forms as well, unless the context clearly indicates otherwise. Although the terms first, second, and the like may be used herein to describe various elements, components, steps and/or operations, these terms are only used to distinguish one element, component, step or operation from another element, component, step, or operation.

FIG. 1 is a block diagram illustrating a storage system according to some example embodiments. Referring to FIG. 1, a storage system 100 may include a host device 110 and a storage device 120. In some example embodiments, the storage system 100 may include at least one of various computing systems such as a personal computer, a notebook, a tablet, a smartphone, and a wearable device, but example embodiments are not limited thereto.

The host device 110 may store data in the storage device 120 and/or may read data stored in the storage device 120. For example, the host device 110 may transmit a write command and write data to the storage device 120 for the purpose of storing data in the storage device 120. Alternatively, to read data stored in the storage device 120, the host device 110 may transmit a read command to the storage device 120 and may receive data from the storage device 120.

In some example embodiments, the host device 110 may include a main processor such as a central processing unit (CPU) or an application processor (AP). Alternatively, in some example embodiments, the host device 110 may include an auxiliary processor, which assists the main processor, such as a graphic processing unit (GPU) or a neural processing unit (NPU).

The storage device 120 may operate under control of the host device 110. In some example embodiments, storage device 120 may include a storage controller 121 and a nonvolatile memory device 122. The storage controller 121 may operate in response to a command received from the host device 110. For example, the storage controller 121 may receive the write command and the write data from the host device 110 and may store the write data in the nonvolatile memory device 122 in response to the write command thus received. Alternatively, in some example embodiments, the storage controller 121 may read the read command from the host device 110 and may read data stored in the nonvolatile memory device 122 in response to the read command thus received. Afterwards, the storage controller 121 may transmit the read data to the host device 110. In some example embodiments, the nonvolatile memory device 122 may be a NAND flash memory device, but example embodiments are not limited thereto.

In some example embodiments, the host device 110 may communicate with the storage device 120 based on the universal flash storage (UFS) interface defined by the JEDEC standard. For example, the host device 110 and the storage device 120 may exchange packets of an UFS protocol information unit (UPIU) format. The UPIU may include a variety of information defined by an interface (e.g., an UFS interface) between the host device 110 and the storage device 120. However, example embodiments are not limited thereto. Below, for convenience of description, the terms "command", "UPIU", and "data" may be used interchangeably and may be used as the same meaning or different meanings depending on some example embodiments.

In some example embodiments, the storage device 120 may further include a temperature sensor 123. The temperature sensor 123 may be configured to measure a device temperature TD of the storage device 120 or the nonvolatile memory device 122. For example, the temperature sensor 123 may measure the device temperature TD at a given period (e.g., at a period of time and/or periodically). In some example embodiments, the given period may be one second or the given period may be one second intervals, but example embodiments are not limited thereto. The measured device temperature TD may be provided to the storage controller 121.

In some example embodiments, the storage controller 121 may be configured to support or manage a write booster function of the storage device 120. For example, the host device 110 may enable or disable the write booster of the storage device 120. When the write booster is enabled, the storage controller 121 may perform a write booster operation. The write booster operation may be performed based on single level cell (SLC) buffering that is performed in a given region of the nonvolatile memory device 122. In some example embodiments, the improved performance of the storage device 120 may be provided.

In some example embodiments, the storage controller 121 may include a write booster buffer (WBB) manager 121a. The write booster buffer manager 121a may manage the write booster operation or a flush operation for a write booster buffer, based on the device temperature TD. For example, the write booster operation may be performed by SLC buffering the write data in the write booster buffer. For example, when there is no available capacity in the write booster buffer, the write booster buffer manager 121a may flush, migrate, or move data (e.g., SLC-buffered data) of the write booster buffer to normal storage, based on various flush policies. As such, the available capacity of the write booster buffer may be secured.

The write booster buffer manager 121a may selectively prohibit the flush operation of the write booster buffer, based on the device temperature TD. For example, when the device temperature TD is included in a reference temperature range, the write booster buffer manager 121a may prohibit the flush operation of the write booster buffer. For example, the write booster buffer may remain full, and thus, the storage controller 121 may program the write data received from the host device 110 in the normal storage instead of the write booster buffer.

In some example embodiments, when the device temperature TD is included in the reference temperature range, the flush operation of the write booster buffer (WBB) may be prohibited. For example, the write number of times of the storage device 120 or the nonvolatile memory device 122 may decrease, and the lifetime thereof may be improved. The operation of the storage device 120 according to some example embodiments will be described in detail with reference to the following drawings.

Below, for convenience of description, example embodiments of the inventive concepts will be described based on the operation of the storage device 120. However, example embodiments of the inventive concepts are not limited thereto. For example, various operations of the write booster buffer and the management of the write booster buffer may be performed by the write booster buffer manager 121a described above. In some example embodiments, the write booster buffer manager 121a may include or be implemented as processing circuitry such as hardware (e.g., logic circuits) or a combination of hardware and software or firmware (e.g., a computer-based electronic system like a processor included in the storage controller 121 executing instruction codes or program routines (e.g., a software program)). Alternatively, the write booster buffer manager 121a may be a hardware circuit configured to implement functions according to some example embodiments.

Figure 2:
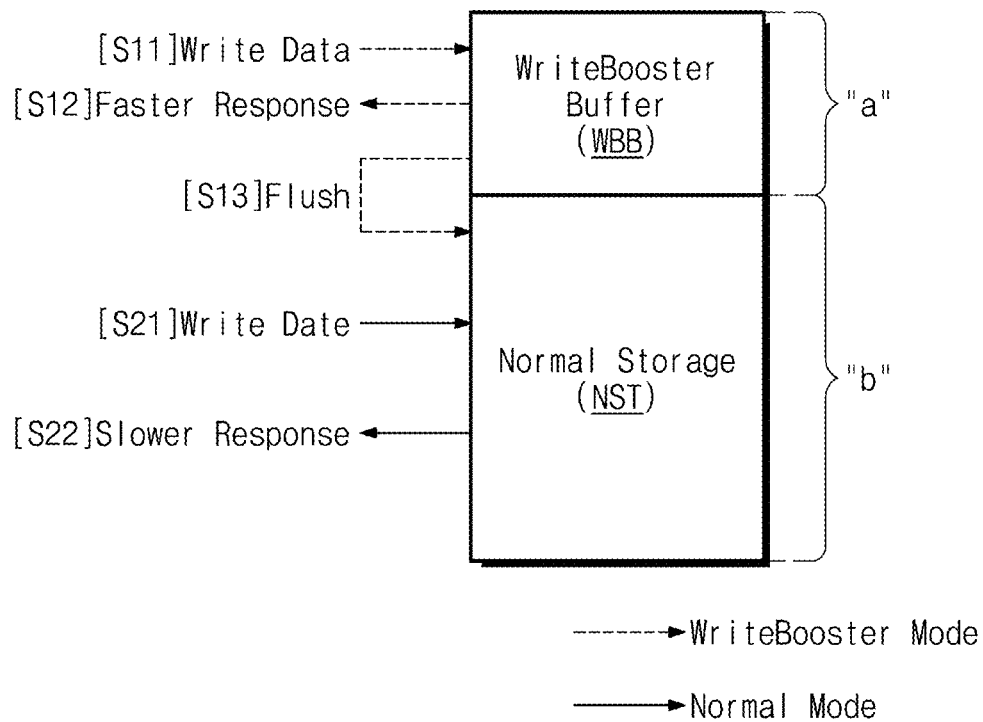
FIG. 2 is a diagram for describing an operation of a storage device of FIG. 1 according to some example embodiments.

FIG. 2 is a diagram for describing an operation of a storage device of FIG. 1 according to some example embodiments. In some example embodiments, a storage space of the storage device 120 may indicate a physical region of the nonvolatile memory device 122, which may be used to store user data. For example, the storage space of the storage device 120 may be a space capable of being identified by the host device 110 as a storage capacity of the storage device 120.

In some example embodiments, the storage device 120 may further include any other storage space in addition to the storage space illustrated in FIG. 2. For example, any other storage space may include various spaces, which are not identified by the host device 110 as the storage capacity of the storage device 120, such as a reserved region, a meta region for storing metadata, or an overprovisioning region for performance improvement, but example embodiments are not limited thereto. Below, for convenience of description of the example embodiments, the detailed description associated with any other storage spaces will be omitted or minimized, and some example embodiments will be described mainly based on the storage space where user data are stored.

Referring to FIGS. 1 and 2, in some example embodiments, the storage space of the storage device 120 may include a write booster buffer WBB and a normal storage NST. The write booster buffer WBB may correspond to a portion (e.g., "a") of the storage space of the storage device 120 (or the storage space of the nonvolatile memory device 122). The normal storage NST may correspond to the remaining portion (e.g., "b") of the storage space of the storage device 120 (or the storage space of the nonvolatile memory device 122). For example, the write booster buffer WBB may be managed as a user region reduction component, and the write booster buffer WBB may be implemented independently of the space of the normal storage NST. For example, the host device 110 may recognize the remaining portion (i.e., "b") of the storage space of the storage device 120 as the storage capacity of the storage device 120.

Alternatively, in some example embodiments, the normal storage NST may correspond to the entire storage space (e.g., portion "a"+portion "b") of the storage device 120. For example, the write booster buffer WBB may be managed as a user region preservation component, and the write booster buffer WBB may be implemented within a partial space of the normal storage NST. For example, the host device 110 may recognize the entire storage space (i.e., a+b) of the storage device 120 as the storage capacity of the storage device 120.

In some example embodiments, the storage space of the storage device 120 may be managed as a plurality of logical units. For example, the write booster buffer WBB may be implemented to operate in a logic dedicated buffer mode. For example, the write booster buffer WBB may be configured to be dedicated for some of the plurality of logical units. Alternatively, in some example embodiments, the write booster buffer WBB may be implemented to operate in a shared buffer mode. For example, the write booster buffer WBB may be shared by the plurality of logical units. The above mode or configuration of the write booster buffer WBB is only an example, and the example embodiments are not limited thereto.

In some example embodiments, each of memory cells corresponding to or included in the write booster buffer WBB may be used as a single level cell (SLC), and each of memory cells corresponding to or included in the normal storage NST may be used as a triple level cell (TLC). Alternatively, in some example embodiments, each of the memory cells corresponding to the write booster buffer WBB may be configured store n-bit data (n being a positive integer), and each of the memory cells corresponding to the normal storage NST may be configured to store m-bit data (m being a positive integer more than n). For example, the write booster buffer WBB may indicate a region supporting a high-speed write operation faster than the normal storage NST.

As described above, the configuration of the write booster buffer WBB and the configuration of the normal storage NST are some example embodiments, but example embodiments are not limited thereto. For example, the number (e.g., k) of bits stored in each of the memory cells corresponding to the write booster buffer WBB may be more than or equal to the number (e.g., i) of bits stored in each of the memory cells corresponding to the normal storage NST (i.e., k≥i), and various parameters of the write operation may be controlled such that the write booster buffer WBB performs a high-speed write operation faster than the normal storage NST.

In some example embodiments, the number of bits stored in a memory cell of each of the write booster buffer WBB and the normal storage NST may be determined based on various factors such as reliability and lifetime. Alternatively, in some example embodiments, the write booster buffer WBB and the normal storage NST may be distinguished from each other by various factors such as reliability and lifetime, in addition to the number of bits per cell.

In some example embodiments, each of reference signs "a" and "b" may mean the number of memory blocks of the nonvolatile memory device 122 corresponding to each storage space. Values of "a" and "b" may be variable depending on the size of each of the write booster buffer WBB and the normal storage NST and a way to implement each of the write booster buffer WBB and the normal storage NST (e.g., an SLC, MLC, TLC, QLC, or OLD way).

In some example embodiments, as described with reference to FIG. 1, the storage device 120 may support the write booster operation. When the write booster is enabled by the host device 110, the storage device 120 may perform the write booster operation. When the write booster is disabled by the host device 110, the storage device 120 may perform the normal write operation.

For example, in operation S11, the write data may be received from the host device 110. Because the write booster is enabled (i.e., because the storage device 120 is in a write booster mode), the storage device 120 may write the write data in the write booster buffer WBB. Afterwards, in operation S12, the storage device 120 may transmit a response (e.g., a faster response) to the host device 110.

For example, in operation S21, the write data may be received from the host device 110. Because the write booster is disabled (i.e., because the storage device 120 is in a normal mode), the storage device 120 may write the write data in the normal storage NST. Afterwards, in operation S22, the storage device 120 may transmit a response (e.g., a slower response) to the host device 110.

In some example embodiments, because the write operation of the write booster buffer WBB is faster than the write operation of the normal storage NST, based on a time point where the write data are received, the response in operation S12 may be faster than the response in operation S22. For example, when the write booster is enabled, the storage device 120 may provide improved performance.

In some example embodiments, the write booster buffer WBB may have a given capacity or size (e.g., "a"). When the write operation of the write booster buffer WBB is repeatedly performed, an available capacity of the write booster buffer WBB may be insufficient, or the write booster buffer WBB may be full. In this case, in operation S13, the storage device 120 may flush, migrate, or move the data stored in the write booster buffer WBB to the normal storage NST, and thus, the available capacity of the write booster buffer WBB may be secured. In some example embodiments, operation S13 (i.e., the flush operation from the write booster buffer WBB to the normal storage NST) may be performed by an explicit request of the host device 110 or may be performed during an idle time of the storage device 120.

Below, to describe example embodiments of the inventive concepts, an operation of writing the write data in the write booster buffer WBB is referred to as a "write booster operation", an operation of writing the write data in the normal storage NST is referred to as a "normal write operation", and the flush operation from the write booster buffer WBB to the normal storage NST is referred to as a "flush operation on write booster buffer".

Figure 3:
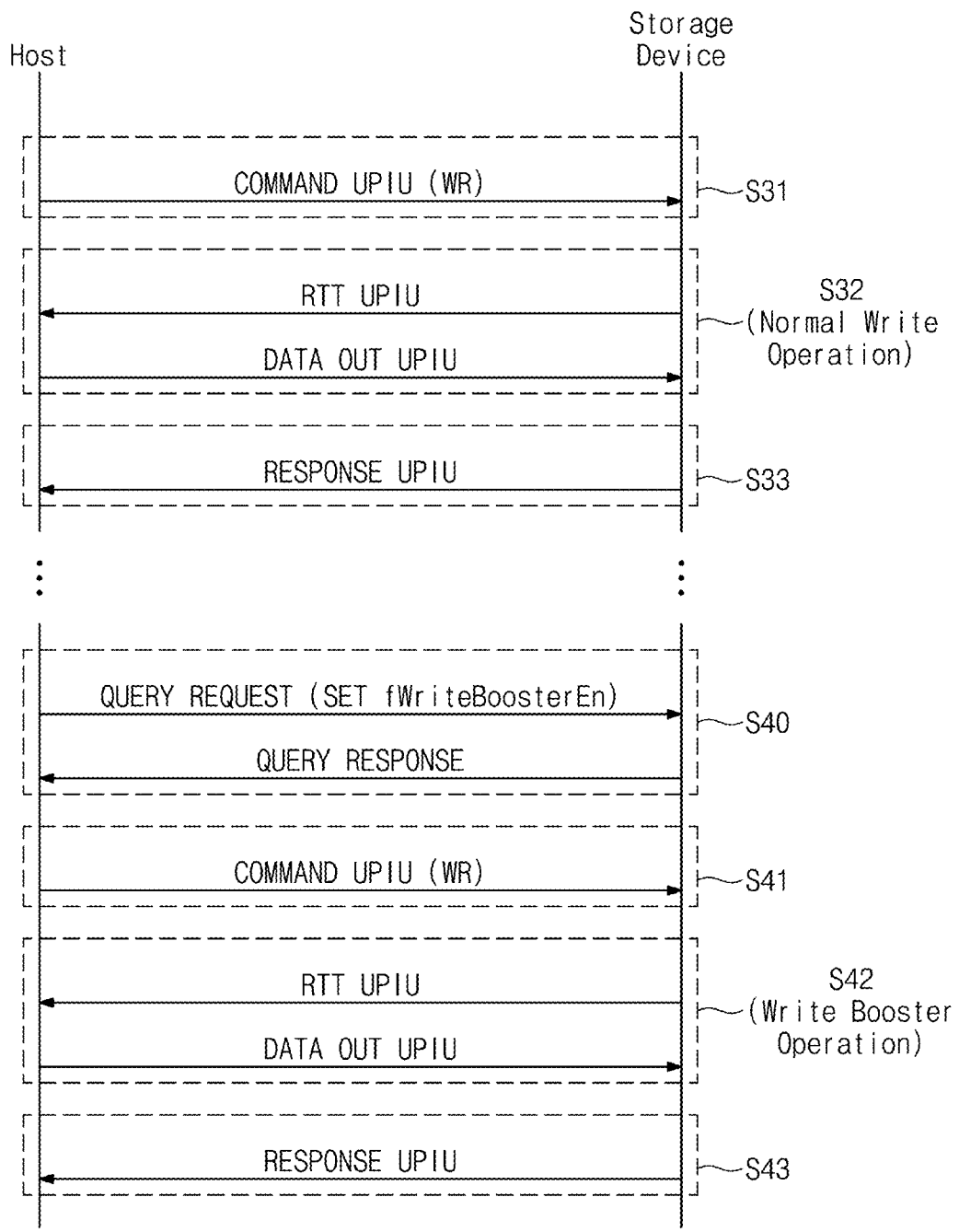
FIG. 3 is a flowchart illustrating an operation of a storage system of FIG. 1 according to some example embodiments.

FIG. 3 is a flowchart illustrating an operation of a storage system of FIG. 1 according to some example embodiments. In some example embodiments, the write booster operation and the normal write operation described with reference to FIG. 2 will be described with reference to FIG. 3.

Referring to FIGS. 1 and 3, in operation S31, the host device 110 may transmit a COMMAND UFS protocol information unit (UPIU) for a write operation (WR) to the storage device 120.

In operation S32, the host device 110 and the storage device 120 may perform data transaction. For example, the storage device 120 may transmit a ready to transfer (RTT) UPIU to the host device 110. In some example embodiments, the RTT UPIU may include information about a data range or size that the storage device 120 is capable of receiving. The host device 110 may transmit a DATA OUT UPIU including the write data to the storage device 120 in response to the RTT UPIU. In some example embodiments, the above operations (e.g., RTT UPIU transmission/reception and DATA OUT UPIU transmission/reception) may be repeatedly performed until the entire write data is transmitted from the host device 110 to the storage device 120.

After the entire write data is received, in operation S33, the storage device 120 may transmit a RESPONSE UPIU to the host device 110. The RESPONSE UPIU may include information indicating that the operation for the COMMAND UPIU in operation S31 is completed.

In some example embodiments, while the write data are received in operation S32, the storage device 120 may perform the normal write operation of the received write data. For example, the storage device 120 may determine whether the write booster is enabled. For example, the storage device 120 may check a value of an "fWriteBoosterEn" field of the FLAGS. When the value of the "fWriteBoosterEn" field is "0b", the write booster may be disabled; when the value of the "fWriteBoosterEn" field is "1b", the write booster may be enabled.

In operation S40, the host device 110 may enable the write booster. For example, the host device 110 may transmit a QUERY REQUEST for setting a value of the "fWriteBoosterEn" field to a specific value (e.g., "1b") to the storage device 120. The value of the write booster enable field fWriteBoosterEn may be set to the specific value (e.g., "1b") in response to the QUERY REQUEST from the host device 110, and the storage device 120 may transmit a QUERY RESPONSE to the host device 110.

In some example embodiments, operation S40 (e.g., the enable of the write booster) may be performed in the initialization operation of the storage device 120. Alternatively, in some example embodiments, operation S40 may be performed by an explicit request of the host device 110 during the operation of the storage device 120.

Afterwards, the host device 110 and the storage device 120 may perform operation S41 to operation S43. Operation S41 to operation S43 are similar to operation S31 to operation S33 except that the write booster operation is performed depending on the value of the "fWriteBoosterEn" field, and thus, additional description will be omitted to avoid redundancy.

In some example embodiments, in operation S42, the storage device 120 may perform the write booster operation with respect to the received write data. For example, as the value of the "fWriteBoosterEn" field is set to the specific value (e.g., "1b"), the write booster may be enabled. For example, the storage device 120 may preferentially write the write data received in operation S42 in the write booster buffer WBB.

In some example embodiments, when the write booster is disabled (e.g., in operation S31 to operation S33), the storage device 120 may perform the normal write operation such that the received write data are stored in the normal storage NST. For example, because a relatively slow normal write operation is performed, a time point where the RESPONSE UPIU is transmitted may be relatively delayed. In contrast, when the write booster is enabled (e.g., in operation S41 to operation S43), the storage device 120 may perform the write booster operation such that the received write data are preferentially stored in the write booster buffer WBB. For example, because a relatively fast write booster operation is performed, a time point where the RESPONSE UPIU is transmitted may be relatively advanced.

Figure 4A:
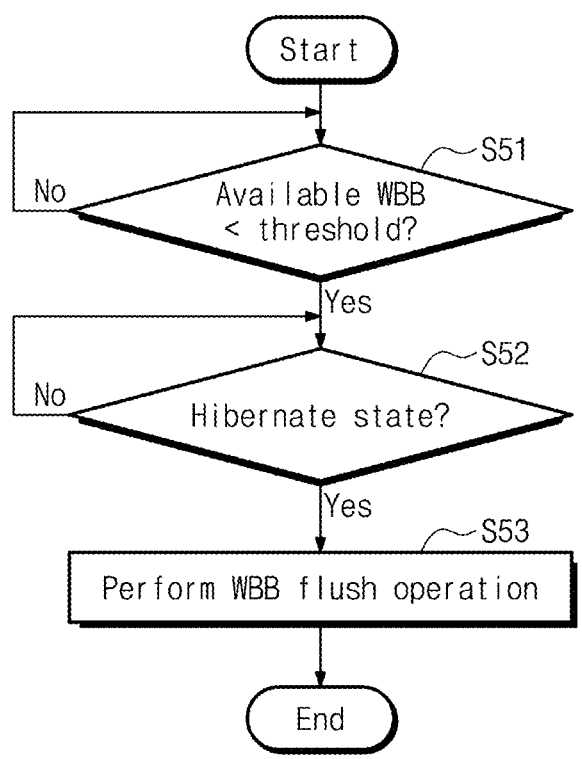
FIG. 4A is a flowchart for describing an operation (e.g., a flush operation on write booster buffer) of a storage device of FIG. 1 according to some example embodiments.
Figure 4B:
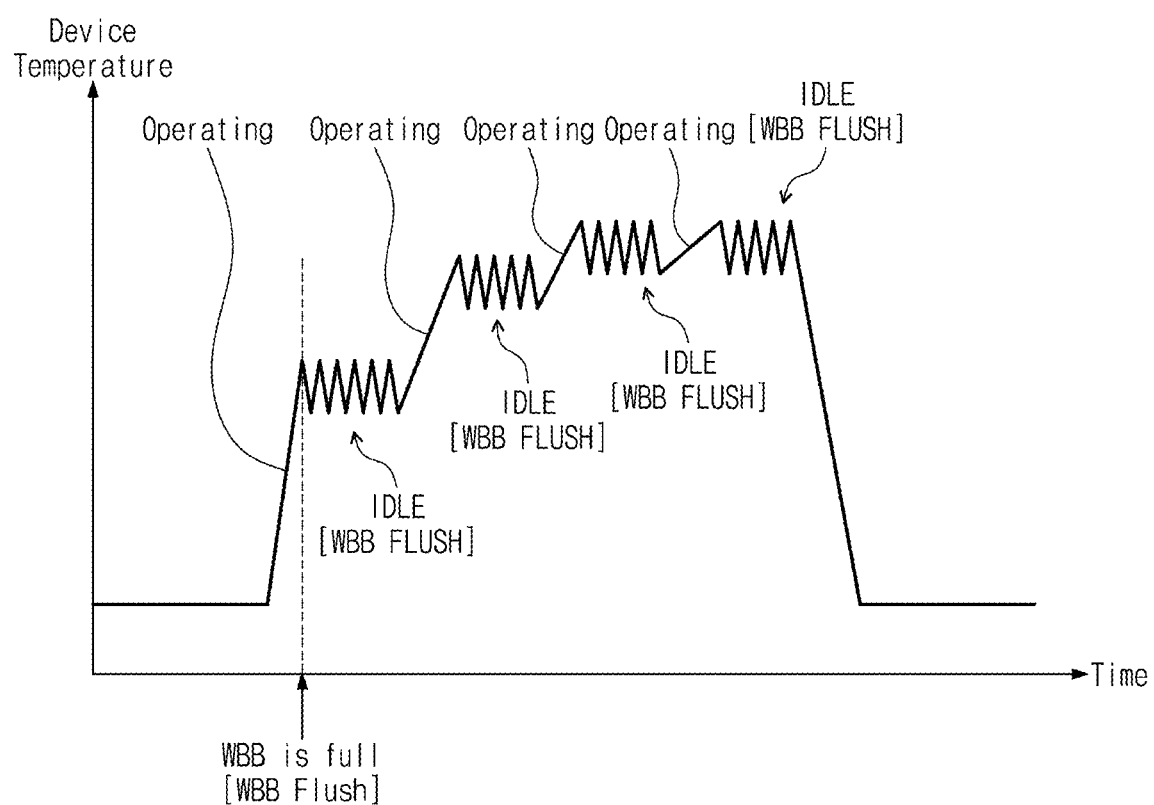
FIG. 4B is a graph illustrating a temperature change according to an operation of a storage device of FIG. 1 according to some example embodiments.

FIG. 4A is a flowchart for describing an operation (e.g., a flush operation on write booster buffer) of a storage device of FIG. 1 according to some example embodiments. FIG. 4B is a graph illustrating a temperature change according to an operation of a storage device of FIG. 1 according to some example embodiments. In FIG. 4B, a horizontal axis represents a time, and a vertical axis represents the device temperature TD.

Referring to FIGS. 1, 2, 4A, and 4B, in operation S51, the storage device 120 may determine whether an available capacity of the write booster buffer WBB is smaller than a reference value (e.g., smaller than a threshold). For example, the write booster buffer WBB may have a size that is in advance set depending on a setting of the host device 110 or the storage device 120. For example, as the write booster operation is repeatedly performed, the available capacity of the write booster buffer WBB may be insufficient. When the available capacity of the write booster buffer WBB is greater than the reference value and/or threshold value (i.e., when the available capacity of the write booster buffer WBB is sufficient), the storage device 120 may repeatedly perform operation S51.

When the available capacity of the write booster buffer WBB is smaller than the reference value and/or threshold value (i.e., when the available capacity of the write booster buffer WBB is insufficient), the storage device 120 may determine whether a current state is a hibernate state. For example, when the storage device 120 does not operate, the storage device 120 may enter the hibernate state for the purpose of reducing power consumption.

When the storage device 120 enters the hibernate state, in operation S53, the storage device 120 may perform the flush operation on write booster buffer (e.g., the storage device 120 may perform WBB flush operation in step S53). For example, the storage device 120 may flush, migrate, or move the data stored in the write booster buffer WBB to the normal storage NST.

In some example embodiments, the flush operation on write booster buffer described with reference to FIG. 4A may be a flush operation on write booster buffer where the flush operation is performed while the storage device 120 is in the hibernate state. In some example embodiments, the flush operation on write booster buffer may be performed in response to that a value of an "fWriteBoosterBufferFlush-DuringHibernate" field of the FLAGS is set to a specific value (e.g., "1b").

In some example embodiments, when the available capacity of the write booster buffer WBB is insufficient (e.g., determined in operation S51), the storage device 120 may secure the available capacity of the write booster buffer WBB by performing the flush operation on write booster buffer in the hibernate state (e.g., operation S53).

For example, as illustrated in FIG. 4B, various user cases may occur in the storage device 120 under control of the host device 110. As the storage device 120 operates, the device temperature TD may increase; when the storage device 120 does not operate, the device temperature TD may decrease.

In some example embodiments, at a specific time point, the write booster buffer WBB may be full, or the available capacity of the write booster buffer WBB may be insufficient. For example, when the storage device 120 enters the hibernate state, the storage device 120 may perform the flush operation on write booster buffer to secure the available capacity of the write booster buffer WBB. Afterwards, the storage device 120 may repeatedly perform the above operation (i.e., the write booster operation and the flush operation on write booster buffer).

According to the above operation, in some example embodiments, the write data are first written in the write booster buffer WBB, and then, the data of the write booster buffer WBB are flushed, migrated, or moved to the normal storage NST; in this case, unit data may cause two or more write operations. That is, the lifetime of the nonvolatile memory device 122 of the storage device 120 may be shortened due to the repetition of the write booster operation and the flush operation on write booster buffer.

In general, various user cases may occur in the storage device 120. In a normal user case among various user cases, a ratio of an idle time to an operating time of the storage device 120 may be relatively great. For example, the idle time of the storage device 120 may be longer than the operating time of the storage device 120 in the following: the case where the host device 110 drives an application program stored in the storage device 120, the case where the host device 110 executes image data stored in the storage device 120, or the case where the host device 110 performs streaming with respect to the data stored in the storage device 120.

As described above, in user cases where the idle time is relatively long, the repetition of the write booster operation and the flush operation on write booster buffer may make the lifetime of the nonvolatile memory device 122 short.

Figure 5:
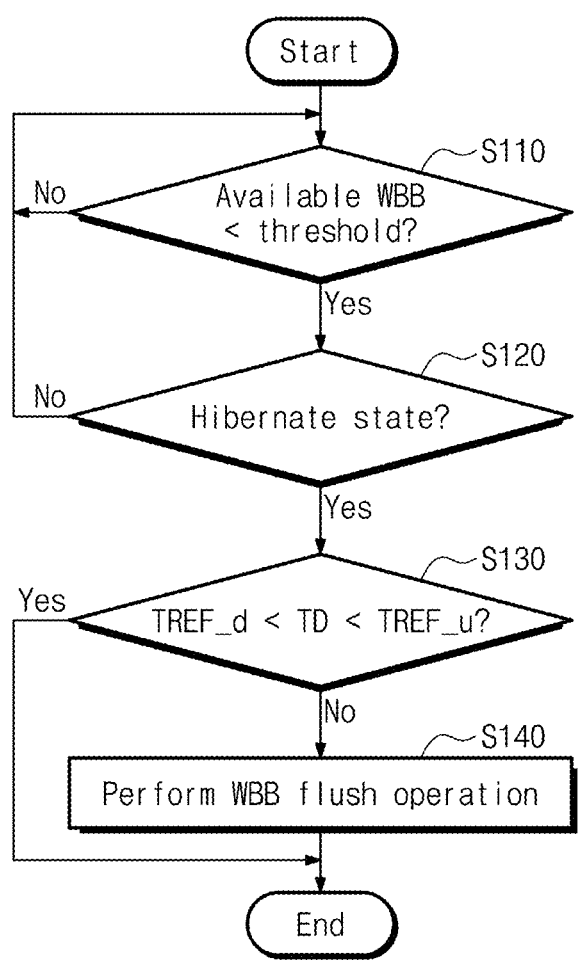
FIG. 5 is a flowchart illustrating an operation of a storage device of FIG. 1 according to some example embodiments.

FIG. 5 is a flowchart illustrating an operation of a storage device of FIG. 1 according to some example embodiments. A configuration in which the storage device 120 selectively performs the flush operation on write booster buffer based on the device temperature TD or prohibits the flush operation on write booster buffer based on the device temperature TD will be described with reference to FIG. 5.

Below, for convenience of description, unless otherwise defined, it is assumed that the write booster of the storage device 120 is in an enable state. For example, the storage device 120 is in a state where the value of the "fWriteBoosterEn" field of the FLAGS is set to an enable state (e.g., "1b").

In some example embodiments, the storage device 120 may operate based on the flush manner where the flush operation is performed while the storage device 120 is in the hibernate state. For example, the storage device 120 may be in a state where a value of the "fWriteBoosterBufferFlush-DuringHibernate" field is set to a specific value (e.g., "1b").

Referring to FIGS. 1 and 5, in some example embodiments, the storage device 120 may perform operation S110 and operation S120. Operation S110 and operation S120 are similar to operation S51 and operation S52 of FIG. 4A, and thus, additional description will be omitted to avoid redundancy.

When the storage device 120 enters the hibernate state (e.g., operation S120), in operation S130, the storage device 120 may determine whether the device temperature TD is included in the reference temperature range. For example, the reference temperature range may indicate a range from a lower reference temperature TREF_d (refer to, e.g., FIG. 7) to an upper reference temperature TREF_u (refer to, e.g., FIG. 7).

In some example embodiments, in the case where the storage device 120 operates based on a specific user case, the device temperature TD may be included in the reference temperature range. For example, the specific user case may indicate the case where the idle time is relatively long. In this case, because the storage device 120 has a relatively long idle time, the device temperature TD may not increase excessively; because the storage device 120 operates sometimes, the device temperature TD may not decrease excessively. For example, in the specific user case, the device temperature TD may be higher than the lower reference temperature TREF_d and may be lower than the upper reference temperature TREF_u.

When the device temperature TD is not included in the reference temperature range (e.g., when the device temperature TD is outside the reference temperature range), in operation S140, the storage device 120 may perform the flush operation on write booster buffer. Operation S140 is similar to operation S53 of FIG. 4A, and thus, additional description will be omitted to avoid redundancy.

When the device temperature TD is included in the reference temperature range (e.g., when the device temperature TD is within the reference temperature range), the storage device 120 may not perform the flush operation on write booster buffer. In other words, in response to that the device temperature TD is included in the reference temperature range, the storage device 120 may prohibit the flush operation on write booster buffer. For example, the available capacity of the write booster buffer WBB may not be secured, and the write booster buffer WBB may maintain a full state or a state where the available capacity is smaller than or equal to the reference value.

Figure 6:
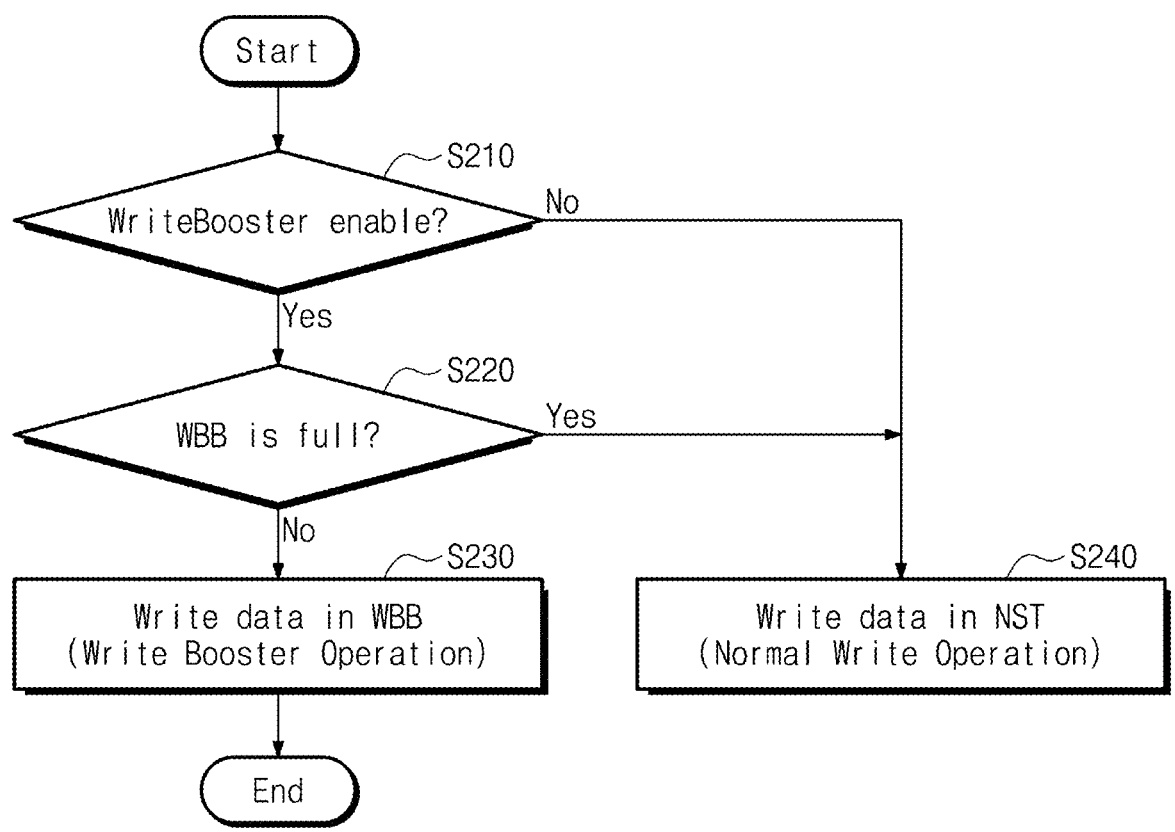
FIG. 6 is a flowchart illustrating an operation of a storage device of FIG. 1 according to some example embodiments.

FIG. 6 is a flowchart illustrating an operation of a storage device of FIG. 1 according to some example embodiment. The write booster operation of the storage device 120 will be described with reference to FIG. 6. Referring to FIGS. 1 and 6, in operation S210, the storage device 120 may determine whether the write booster is enabled. For example, the storage device 120 may determine whether the write booster is enabled, by checking a value of the "fWriteBoosterEn" field of the FLAGS. When the value of the "fWriteBoosterEn" field is "0b", the write booster may be disabled; when the value of the "fWriteBoosterEn" field is "1b", the write booster may be enabled.

When the write booster is not enabled, in operation S240, the storage device 120 may write the data in the normal storage NST. Alternatively, the storage device 120 may perform the normal write operation.

When the write booster is enabled, in operation S220, the storage device 120 may determine whether the write booster buffer WBB is full in operation S220. When the write booster buffer WBB is not full (or when the available capacity of the write booster buffer WBB is sufficient), in operation S230, the storage device 120 may write the data in the write booster buffer WBB. Alternatively, the storage device 120 may perform the write booster operation.

When the write booster buffer WBB is full (or when the available capacity of the write booster buffer WBB is insufficient), in operation S240, the storage device 120 may write the data in the normal storage NST. Alternatively, the storage device 120 may perform the normal write operation.

As described above, according to some example embodiments, when the write booster is in an enable state and the available capacity of the write booster buffer WBB is sufficient, the storage device 120 may perform the write booster operation. In contrast, according to some example embodiments, when the available capacity of the write booster buffer WBB is insufficient even though the write booster is in an enable state, the storage device 120 may perform the normal write operation.

For example, considering both the flowchart of FIG. 5 and the flowchart of FIG. 6, when the device temperature TD of the storage device 120 is included in the reference temperature range, the storage device 120 may prohibit the flush operation on write booster buffer. In this case, the available capacity of the write booster buffer WBB may be insufficient. As such, even though the write booster is enabled, the storage device 120 may not perform the write booster operation but performs the normal write operation with respect to next write data.

According to some example embodiments, because the data input from the host device 110 are written in the normal storage NST instead of the write booster buffer WBB, the additional reduction of lifetime of the nonvolatile memory device 122 due to the flush operation may be prevented. Also, in some example embodiments, when the device temperature TD of the storage device 120 is included in the reference temperature range, the storage device 120 may prohibit the flush operation on write booster buffer, and thus, the user may not experience the reduction of performance. For example, that the device temperature TD of the storage device 120 is included in the reference temperature range means that the storage device 120 operates based on the specific user case (e.g., the user case where the idle time is relatively long). For example, in the specific user case, even though the storage device 120 performs the normal write operation instead of the write booster operation, the user may not actually experience the reduction of performance.

Figure 7:
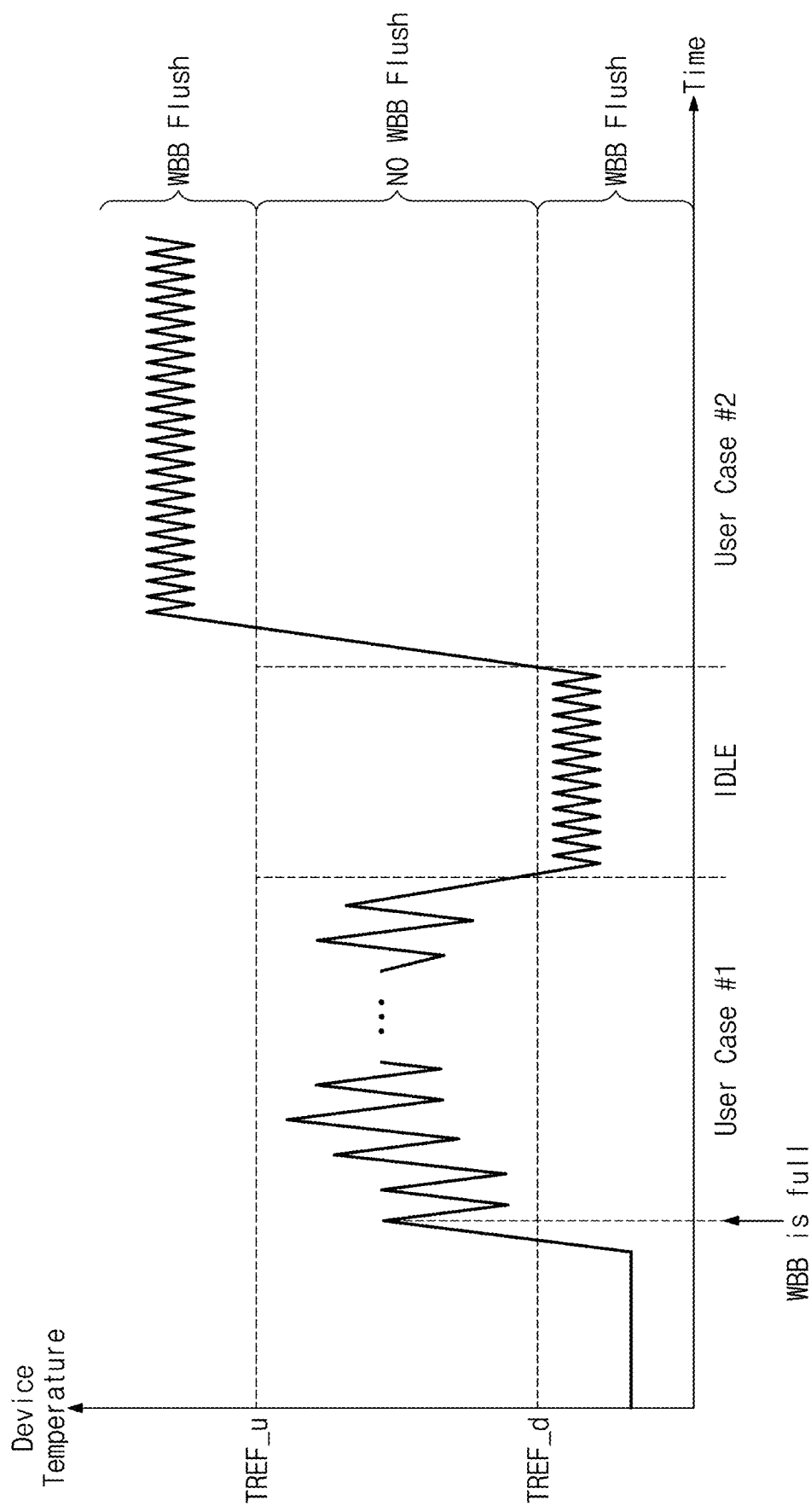
FIG. 7 is a graph for describing a device temperature change of a storage device according to the flowcharts of FIGS. 5 and 6.

FIG. 7 is a graph for describing a device temperature change of a storage device according to the flowcharts of FIGS. 5 and 6. In FIG. 7, a horizontal axis represents a time, and a vertical axis represents device temperature.

Referring to FIGS. 1 and 5 to 7, in some example embodiments the storage device 120 may operate based on various user cases. As the storage device 120 operates, the device temperature TD of the storage device 120 may increase; as the storage device 120 does not operate, the device temperature TD of the storage device 120 may decrease.

As illustrated in FIG. 7, in some example embodiments, as the storage device 120 operates (e.g., performs the write booster operation), the write booster buffer WBB may be full (alternatively, there may be no available capacity of the write booster buffer WBB). In this case, the storage device 120 may determine whether to perform the flush operation on write booster buffer based on the device temperature TD. As illustrated in FIG. 7, in the first user case (User Case #1), the device temperature TD may be included in the reference temperature range (e.g., the device temperature TD may be in a range from TREF_d to TREF_u). The storage device 120 may prohibit the flush operation on write booster buffer in response to the device temperature TD being included in the reference temperature range. In this case, the write booster buffer WBB may remain full. As such, during the first user case, the storage device 120 may perform the normal write operation without performing the write booster operation.

After the first user case, as the storage device 120 is not used, the storage device 120 may maintain an idle state (IDLE). As the storage device 120 maintains the idle state, the device temperature TD of the storage device 120 may be lower than the reference temperature range from TREF_d to TREF_u (e.g., TD<TREF_d). In this case, the storage device 120 may perform the flush operation on write booster buffer (WBB Flush) to secure the available capacity of the write booster buffer WBB.

Afterwards, the storage device 120 may operate based on a second user case (User Case #2). In some example embodiments, the second user case may be a user case that requires a high-speed operation such as benchmark or high-capacity file copy. For example, the second user case may have a relatively short idle time compared to the first user case; during the second user case, the device temperature TD of the storage device 120 may be higher than the reference temperature range from TREF_d to TREF_u. In this case, the storage device 120 may perform the flush operation on write booster buffer (WBB Flush) to secure the available capacity of the write booster buffer WBB. As such, the storage device 120 may perform the write booster operation to support a relatively fast high-speed operation.

According to the above description, in some example embodiments, in the case where the storage device 120 operates based on the specific user case, the device temperature TD may be included in the reference temperature range from TREF_d to TREF_u. In other words, that the device temperature TD is included in the reference temperature range from TREF_d to TREF_u may mean that the storage device 120 operates based on the specific user case. However, example embodiments are not limited thereto. For example, even though the device temperature TD is included in the reference temperature range from TREF_d to TREF_u, the storage device 120 may not operate based on the specific user case; alternatively, even though the storage device 120 operates based on the specific user case, the device temperature TD may not be included in the reference temperature range from TREF_d to TREF_u.

As described above, according to some example embodiments, the storage device 120 may selectively prohibit the flush operation on write booster buffer based on the device temperature TD. For example, as the flush operation on write booster buffer is prohibited in the specific user case where the idle time is relatively long, the normal write operation may be performed instead of the write booster operation. This may mean that the number of times of the flush operation on write booster buffer decreases. Accordingly, the lifetime of the nonvolatile memory device 122 may be improved. Also, in some example embodiments, even though the flush operation on write booster buffer is prohibited in the specific user case, because the idle time is relatively long, the actual reduction of performance may not be caused, or the user may not experience the reduction of performance. Also, in some example embodiments, when the device temperature TD is not included in the reference temperature range from TREF_d to TREF_u, because the storage device 120 may perform the flush operation on write booster buffer complying with various policies, the actual reduction of performance of the storage device 120 may be prevented.

In some example embodiments, the specific user case (e.g., the user case where the device temperature TD is included in the reference temperature range from TREF_d to TREF_u) may include various types of cases. For example, as described above according to some example embodiments, the specific user case may include a user case where the idle time is relatively long. Alternatively, in some example embodiments, the specific user case may include a user case where garbage collection is caused due to fragmentation of data stored in the storage device 120. For example, when the device temperature TD is included in the reference temperature range (e.g., TREF_d to TREF_u), because the flush operation on write booster buffer is prohibited and only garbage collection for data fragmentation is performed, efficient garbage collection may be possible. The above specific user cases are provided only as examples, and example embodiments are not limited thereto.

Figure 8:
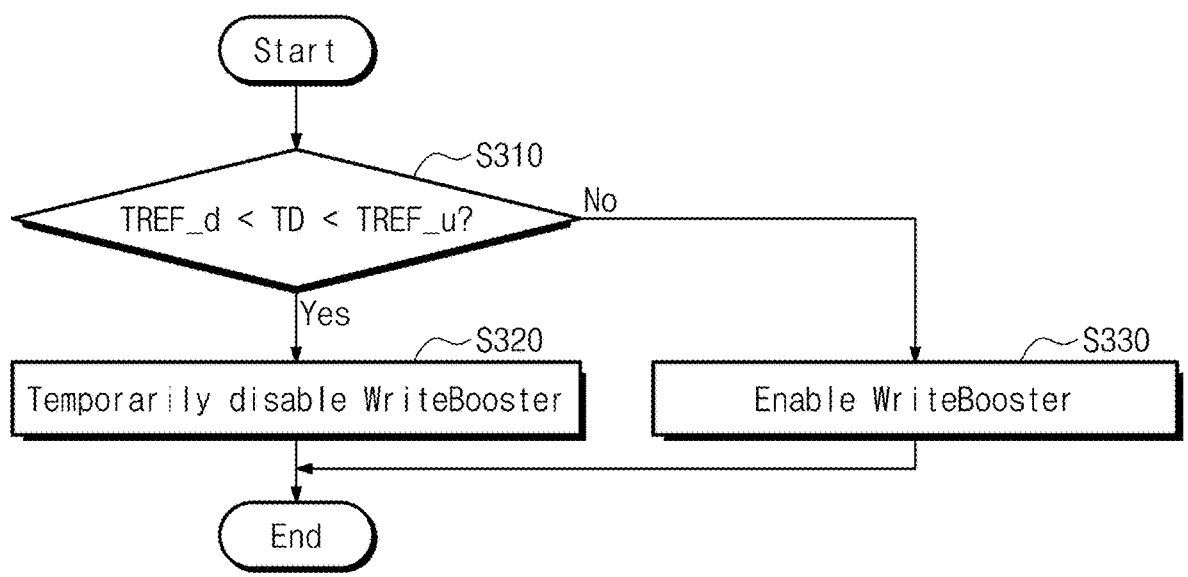
FIG. 8 is a flowchart illustrating an operation of a storage device of FIG. 1 according to some example embodiments.

FIG. 8 is a flowchart illustrating an operation of a storage device of FIG. 1 according to some example embodiments. Referring to FIGS. 1 and 8, in operation S310, the storage device 120 may determine whether the device temperature TD is included in the reference temperature range from TREF_d to TREF_u. The relationship of the device temperature TD and the reference temperature range from TREF_d to TREF_u is described above according to some example embodiments, and thus, additional description will be omitted to avoid redundancy.

When the device temperature TD is determined as included in the reference temperature range from TREF_d to TREF_u (e.g., in operation S310), in operation S320, the storage device 120 may temporarily disable the write booster. For example, the storage device 120 may set a value of a field (e.g., fWriteBoosterEn) indicating whether to enable the write booster to a value (e.g., "0b") corresponding to "disable". Alternatively, the storage device 120 may be configured to set a specific field or a reserved field indicating temporary disable of the write booster. When the write booster is temporarily disabled, the storage device 120 may perform only the normal write operation.

When the device temperature TD is determined as not included in the reference temperature range from TREF_d to TREF_u (e.g., in operation S310), in operation S330, the storage device 120 may enable the write booster. For example, the storage device 120 may set a value of the field (e.g., fWriteBoosterEn) indicating whether to enable the write booster to a value (e.g., "1b") corresponding to "enable". Alternatively, the storage device 120 may be configured to reset the specific field or the reserved field indicating temporary disable of the write booster. When the write booster is enabled, the storage device 120 may preferentially perform the write booster operation by using the write booster buffer WBB.

As described above, when the device temperature TD is included in the reference temperature range from TREF_d to TREF_u (e.g., determined in operation S310), the storage device 120 may temporarily disable the write booster (e.g., in operation S320). In this case, because the data are directly written in the normal storage NST, the reduction of lifetime of the nonvolatile memory device 122 due to an additional flush operation(s) may be prevented.

Figure 9:
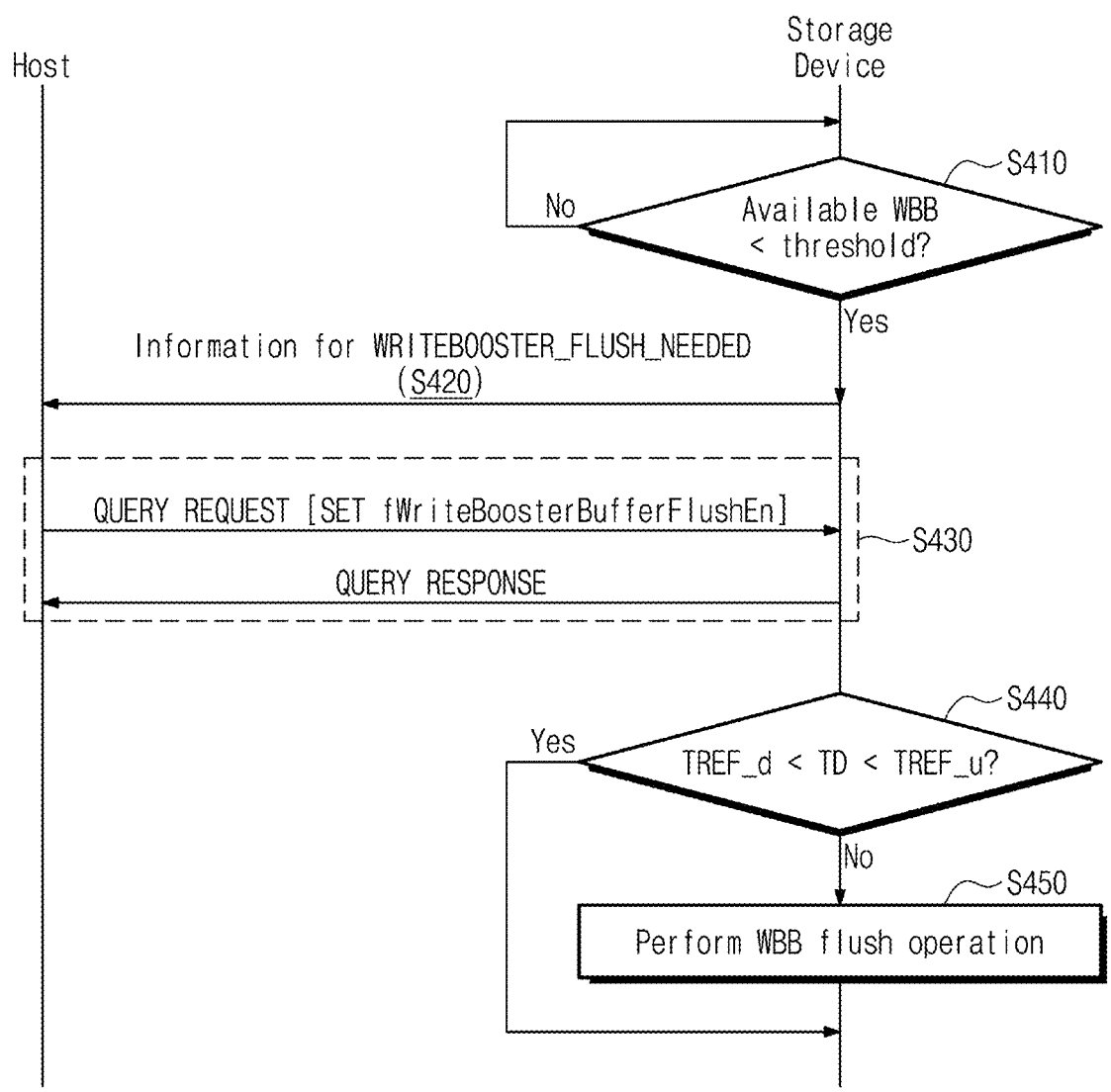
FIG. 9 is a flowchart illustrating an operation of a storage system of FIG. 1 according to some example embodiments.

FIG. 9 is a flowchart illustrating an operation of a storage system of FIG. 1 according to some example embodiments. In some example embodiments, it is assumed that the storage device 120 that performs the operation according to the flowchart of FIG. 9 does not perform the flush operation during the hibernate state and performs the flush operation on write booster buffer in response to an explicit request of the host device 110. For example, the storage device 120 may be in a state where a value of the "fWriteBoosterBufferFlushDuringHibernate" field of the FLAGS is set to a value (e.g., "0b") corresponding to "disable".

Referring to FIGS. 1 and 9, in operation S410, the storage device 120 may determine whether the available capacity of the write booster buffer WBB is smaller than the reference value or threshold value. When the available capacity of the write booster buffer WBB is greater than the reference value or threshold value (e.g., when the available capacity of the write booster buffer WBB is sufficient), the storage device 120 may not perform a separate operation.

When the available capacity of the write booster buffer WBB is smaller than the reference value or threshold value (e.g., when the available capacity of the write booster buffer WBB is insufficient), in operation S420, the storage device 120 may transmit information for "WRITEBOOSTER_FLUSH_NEEDED" to the host device 110. For example, the information for "WRITEBOOSTER_FLUSH_NEEDED" may be transmitted to the host device 110 through an Exception Events Mechanism defined by the UFS standard and may correspond to a "WRITEBOOSTER_FLUSH_NEEDED" field.

In operation S430, the host device 110 may transmit an explicit flush request to the storage device 120 in response to the information for "WRITEBOOSTER_FLUSH_NEEDED". For example, the host device 110 may transmit a QUERY REQUEST for setting an "fWriteBoosterBufferFlushEn" filed of the FLAGS to the storage device 120. The storage device 120 may set a value of the "fWriteBoosterBufferFlushEn" field to "1b" in response to the QUERY REQUEST. Afterwards, the storage device 120 may transmit a QUERY RESPONSE to the host device 110.

In operation S440, the storage device 120 may determine whether the device temperature TD is included in the reference temperature range from TREF_d to TREF_u. When the device temperature TD is not included in the reference temperature range from TREF_d to TREF_u, in operation S450, the storage device 120 may perform the flush operation on write booster buffer. In some example embodiments, the flush operation on write booster buffer in operation S450 may be performed in response to the explicit flush request (e.g., a request for setting the "fWriteBoosterBufferFlushEn" field) of the host device 110.

When the device temperature TD is included in the reference temperature range from TREF_d to TREF_u (operation S440), the storage device 120 may not perform the flush operation on write booster buffer. When the device temperature TD is included in the reference temperature range from TREF_d to TREF_u, even though the explicit flush request is received from the host device 110, the storage device 120 may prohibit the flush operation on write booster buffer.

In some example embodiments, when the flush operation on write booster buffer is prohibited, as in the above description, the write booster buffer WBB may be full. For example, even though the write booster is enabled, the storage device 120 may perform the normal write operation instead of the write booster operation. Effects obtained through the above operation, for example, the improvement of lifetime and the reduction of performance of the storage device 120 are described above, and thus, additional description will be omitted to avoid redundancy.

Figure 10:
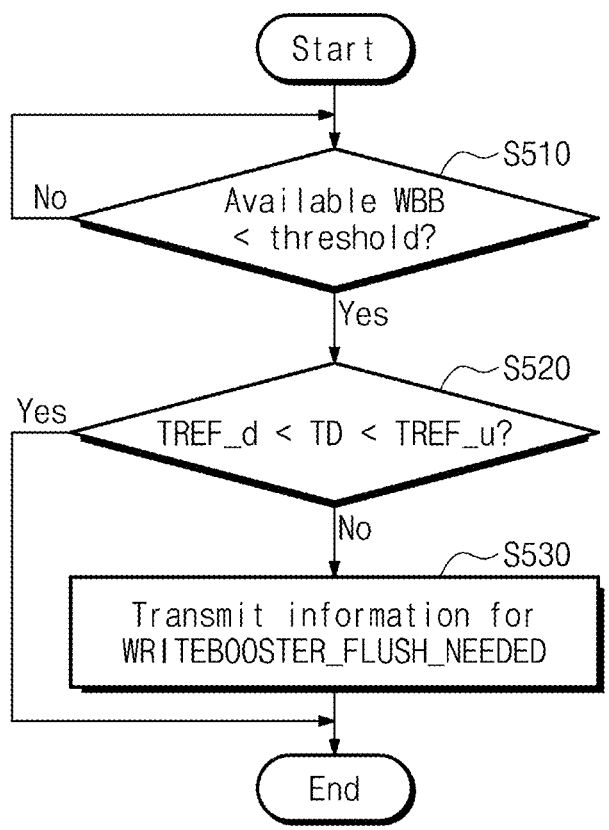
FIG. 10 is a flowchart illustrating an operation of a storage device of FIG. 1 according to some example embodiments.

FIG. 10 is a flowchart illustrating an operation of a storage device of FIG. 1 according to some example embodiments. In some example embodiments, it is assumed that the storage device 120 that performs the operation according to the flowchart of FIG. 10 does not perform the flush operation during the hibernate state and performs the flush operation on write booster buffer in response to an explicit request of the host device 110. For example, the storage device 120 may be in a state where a value of the "fWriteBoosterBufferFlushDuringHibernate" field of the FLAGS is set to a value (e.g., "0b") corresponding to "disable".

Referring to FIGS. 1 and 10, in operation S510, the storage device 120 may determine whether the available capacity of the write booster buffer WBB is smaller than the reference value or the threshold value. When the available capacity of the write booster buffer WBB is not smaller than the reference value or threshold value (e.g., when the available capacity of the write booster buffer WBB is sufficient), the storage device 120 may not perform a separate operation.

When the available capacity of the write booster buffer WBB is smaller than the reference value or threshold value (e.g., when the available capacity of the write booster buffer WBB is insufficient), in operation S520, the storage device 120 may determine whether the device temperature TD is included in the reference temperature range from TREF_d to TREF_u.

When the device temperature TD is not included in the reference temperature range from TREF_d to TREF_u, in operation S530, the storage device 120 may transmit the information about "WRITEBOOSTER_FLUSH_NEEDED" to the host device 110. For example, the information for "WRITEBOOSTER_FLUSH_NEEDED" may be transmitted to the host device 110 through an Exception Events Mechanism defined by the UFS standard and may correspond to a "WRITEBOOSTER_FLUSH_NEEDED" field. In some example embodiments, the host device 110 may transmit the explicit flush request to the storage device 120 in response to the information for "WRITEBOOSTER_FLUSH_NEEDED" being received. The storage device 120 may perform the flush operation on write booster buffer in response to receiving the explicit flush request.

When the device temperature TD is included in the reference temperature range from TREF_d to TREF_u, the storage device 120 may not perform a separate operation. For example, when the device temperature TD is included in the reference temperature range from TREF_d to TREF_u, even though the available capacity of the write booster buffer WBB is insufficient, the information for "WRITEBOOSTER_FLUSH_NEEDED" may not be transmitted to the host device 110. For example, the host device 110 may not transmit the explicit flush request, and thus, the storage device 120 may not perform the flush operation on write booster buffer.

In some example embodiments, in the operation methods described with reference to FIGS. 9 and 10, the description is given as the host device 110 transmits the explicit flush request in response to the information for "WRITEBOOSTER_FLUSH_NEEDED", but example embodiments are not limited thereto. For example, the host device 110 may check the available capacity of the write booster buffer WBB based on a specific field (e.g., bAvailableWriteBoosterBufferSize) of the ATTRIBUTES of the storage device 120. When the available capacity of the write booster buffer WBB is insufficient, the host device 110 may transmit the explicit flush request to the storage device 120. When the device temperature TD is included in the reference temperature range from TREF_d to TREF_u, even though the storage device 120 receives the explicit flush request, the storage device 120 may not perform the flush operation on write booster buffer.

Figure 11:
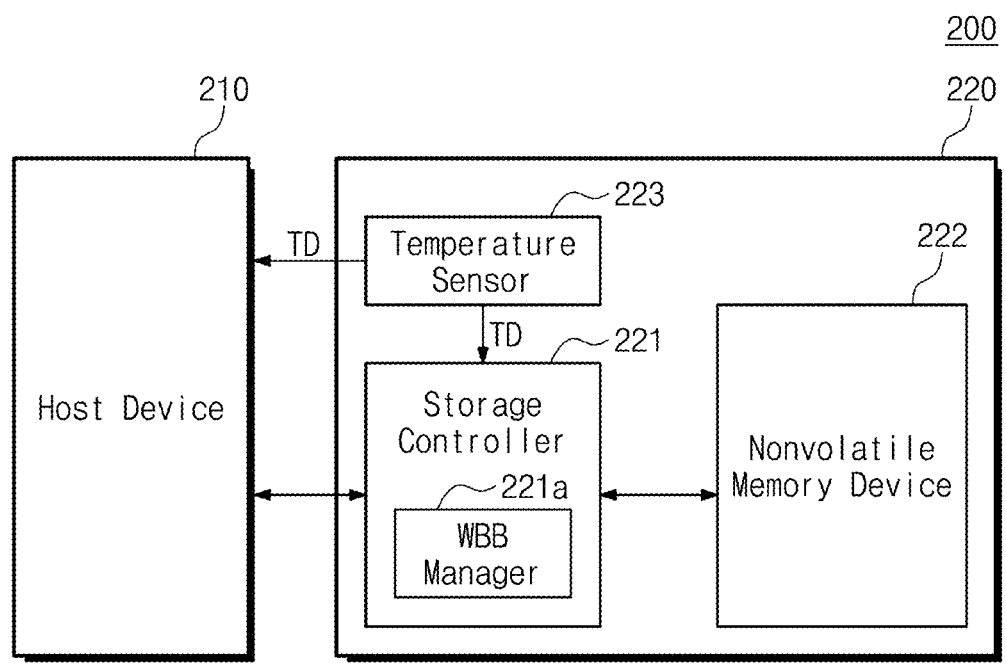
FIG. 11 is a block diagram illustrating a storage system according some example embodiments.

FIG. 11 is a block diagram illustrating a storage system according to some example embodiments. Referring to FIG. 11, a storage system 200 may include a host device 210 and a storage device 220. The storage device 220 may include a storage controller 221, a nonvolatile memory device 222, and a temperature sensor 223. The storage controller 221 may include a write booster buffer manager 221a. The storage system 200 and the components of the storage system 200 are similar to those described above, and thus, additional description will be omitted to avoid redundancy.

In some example embodiments, the temperature sensor 223 may provide the device temperature TD to the host device 210. For example, the temperature sensor 223 may periodically measure the device temperature TD of the storage device 220 or the nonvolatile memory device 222 and may provide the measured device temperature TD to the host device 210. In some example embodiments, the device temperature TD may be provided through a given interface (e.g., an UFS interface) between the host device 210 and the storage device 220. Alternatively, the device temperature TD may be provided to the host device 210 through an interface (e.g., I2C, I3C, UART, or SPI) different from the given interface between the host device 210 and the storage device 220.

The host device 210 may selectively prohibit or disable the flush operation on write booster buffer of the storage device 220, based on the device temperature TD received from the storage device 220. For example, when the device temperature TD thus received is included in the reference temperature range (e.g., temperature range TREF_u to TREF_d), the host device 210 may prohibit the flush operation on write booster buffer of the storage device 220. In some example embodiments, the prohibition of the flush operation on write booster buffer of the storage device 220 may be implemented by resetting values of specific fields (e.g., fWriteBoosterBufferFlushDuringHibernate and fWriteBoosterBufferFlushEn) of the storage device 220 to a value corresponding to "disable".

In some example embodiments, when the device temperature TD thus received again becomes lower than the reference temperature range (e.g., temperature range TREF_u to TREF_d) or again becomes higher than the reference temperature range (e.g., temperature range TREF_u to TREF_d), the host device 210 may resume the flush operation on write booster buffer of the storage device 220. In some example embodiments, the resume of the flush operation on write booster buffer of the storage device 220 may be implemented by setting values of specific fields (e.g., fWriteBoosterBufferFlushDuringHibernate and fWriteBoosterBufferFlushEn) of the storage device 220 to a value corresponding to "enable".

In some example embodiments, the host device 210 may temporarily disable the write booster of the storage device 220, based on the device temperature TD received from the storage device 220. For example, when the device temperature TD thus received is included in the reference temperature range (e.g., temperature range TREF_d to TREF_u), the host device 210 may temporarily disable the write booster of the storage device 220. In some example embodiments, the disable of the write booster of the storage device 220 may be implemented by resetting a value of a specific field (e.g., fWriteBoosterEn) of the storage device 220 to a value corresponding to "disable".

In some example embodiments, when the device temperature TD thus received again becomes lower than the reference temperature range (e.g., temperature range TREF_d to TREF_u) or again becomes higher than the reference temperature range (e.g., temperature range TREF_d to TREF_u), the host device 210 may resume the write booster of the storage device 220. In some example embodiments, the resume of the write booster of the storage device 220 may be implemented by setting a value of a specific field (e.g. and fWriteBoosterEn) of the storage device 220 to a value corresponding to "enable".

As described above, according to some example embodiments, the host device 210 may selectively prohibit or disable the flush operation on write booster buffer or the write booster of the storage device 220, based on the device temperature TD of the storage device 220. Accordingly, as in the above description, according to some example embodiments, in the specific user case, because the normal write operation is performed instead of the write booster operation, the lifetime of the storage device 220 or the nonvolatile memory device 222 may be improved.

Figure 12:
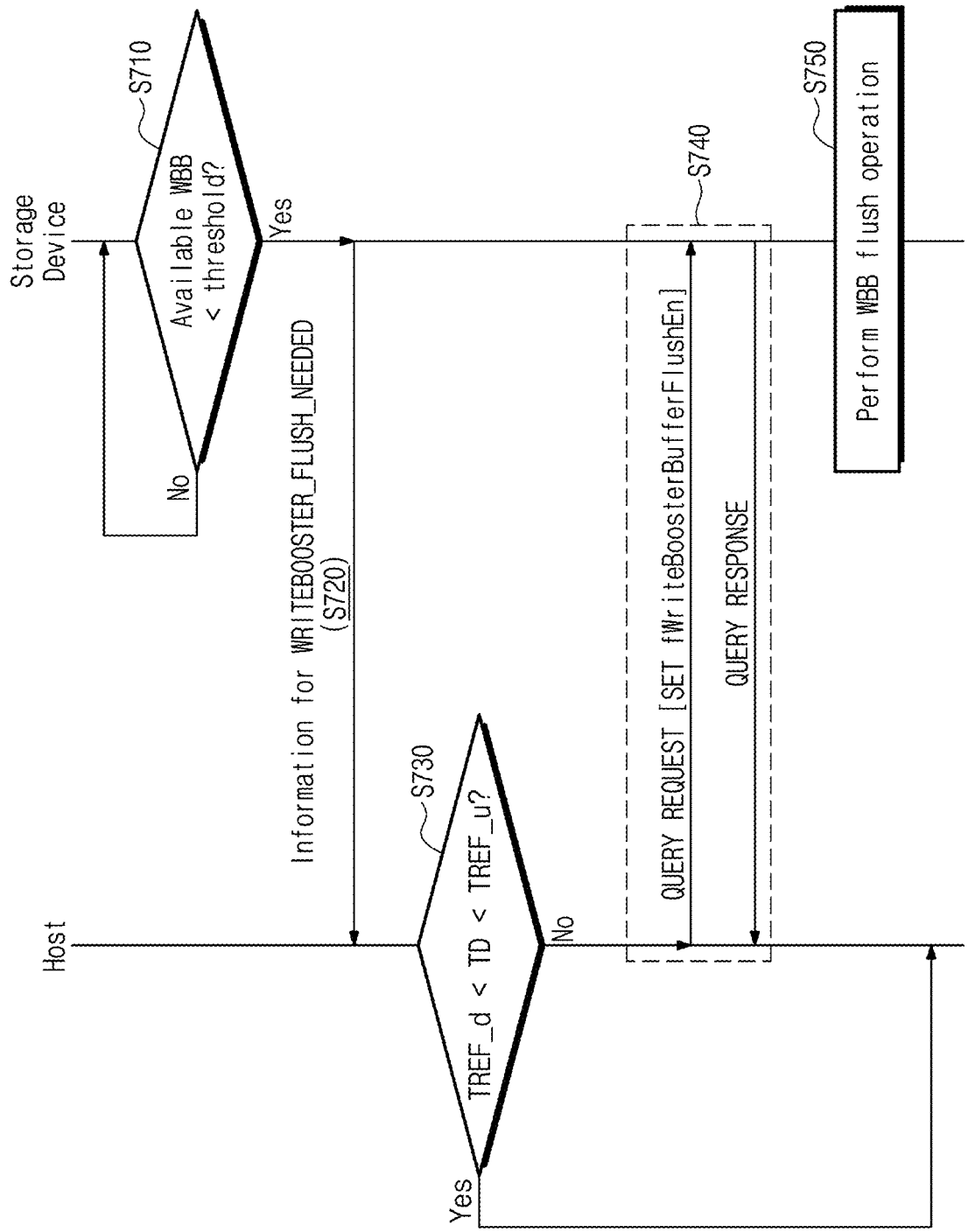
FIG. 12 is a flowchart illustrating an operation of a storage system of FIG. 11 according to some example embodiments.

FIG. 12 is a flowchart illustrating an operation of a storage system of FIG. 11 according to some example embodiments. For convenience of description, it is assumed that the storage device 220 is in a state where the write booster is enabled and the flush operation on write booster buffer is disabled during the hibernate (i.e., fWriteBoosterEn="0b" and fWriteBoosterBufferFlushDuringHibernate="0b"). For example, the storage device 120 may perform the flush operation on write booster buffer in response to the explicit flush request from the host device 210.

Referring to FIGS. 11 and 12, in operation S710, the storage device 220 may determine whether the available capacity of the write booster buffer WBB is smaller than the reference value or threshold value. When the available capacity of the write booster buffer WBB is smaller than the reference value or threshold value, in operation S720, the storage device 220 may transmit information for "WRITEBOOSTER_FLUSH_NEEDED" to the host device 210. Operation S710 and operation S720 are similar to operation S410 and operation S420 of FIG. 9, and thus, additional description will be omitted to avoid redundancy.

In operation S730, the host device 210 may determine whether the device temperature TD is included in the reference temperature range from TREF_d to TREF_u, in response to the information for "WRITEBOOSTER_FLUSH_NEEDED". The technical meaning that the device temperature TD is included in the reference temperature range from TREF_d to TREF_u is described above according to some example embodiments, and thus, additional description will be omitted to avoid redundancy.

When the device temperature TD is not included in the reference temperature range from TREF_d to TREF_u, in operation S740, the host device 210 may transmit the explicit flush request to the storage device 220 (e.g., the host device 210 may transmit QUERY REQUEST setting "fWriteBoosterBufferFlushEn"). In operation S750, the storage device 220 may perform the flush operation on write booster buffer in response to the explicit flush request. Operation S740 and operation S750 are similar to operation S430 and operation S450 of FIG. 9, and thus, additional description will be omitted to avoid redundancy.

When the device temperature TD is included in the reference temperature range from TREF_d to TREF_u, the host device 210 may not perform a separate operation. For example, when the device temperature TD is included in the reference temperature range from TREF_d to TREF_u, the host device 210 may not transmit the explicit flush request to the storage device 220. For example, when the device temperature TD is included in the reference temperature range from TREF_d to TREF_u, the storage device 220 may not perform the flush operation on write booster buffer.

Figure 13:
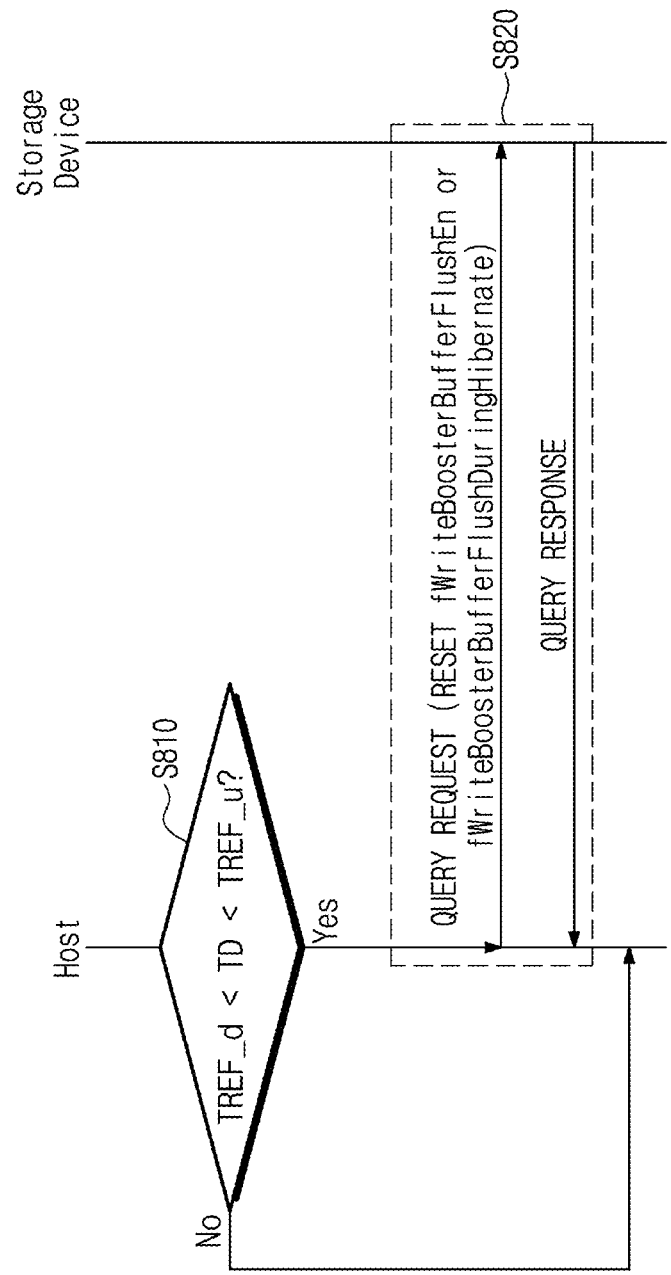
FIG. 13 is a flowchart illustrating an operation of a storage system of FIG. 11 according to some example embodiments.

FIG. 13 is a flowchart illustrating an operation of a storage system of FIG. 11 according to some example embodiments. For convenience of description, it is assumed that the write booster of the storage device 220 is in an enable state (i.e., fWriteBoosterEn="1b"). Referring to FIGS. 11 and 13, in operation S810, the host device 210 may determine whether the device temperature TD is included in the reference temperature range from TREF_d to TREF_u.

When the device temperature TD is included in the reference temperature range from TREF_d to TREF_u, in operation S820, the host device 210 may reset values of various (e.g., fWriteBoosterBufferFlushEn or fields fWriteBoosterBufferFlushDuringHibernate) associated with the flush operation on write booster buffer to a value (e.g., "0b") corresponding to "disable". For example, the host device 210 may transmit the QUERY REQUEST, in operation 820, for resetting values of various fields (e.g., fWriteBoosterBufferFlushEn or fWriteBoosterBufferFlushDuringHibernate) associated with the flush operation on write booster buffer to the storage device 220. The storage device 220 may reset various fields (e.g., fWriteBoosterBufferFlushEn or fWriteBoosterBufferFlushDuringHibernate) associated with the flush operation on write booster buffer in response to the QUERY REQUEST. Afterwards, the storage device 220 may transmit the QUERY RESPONSE to the host device 210.

As described above, in some example embodiments, when values of various fields (e.g., fWriteBoosterBufferFlushEn or fWriteBoosterBufferFlushDuringHibernate) associated with the flush operation on write booster buffer are reset to a value corresponding to "disable", the storage device 220 may not perform the flush operation on write booster buffer.

When the device temperature TD is not included in the reference temperature range from TREF_d to TREF_u, the host device 210 may not perform a separate operation. For example, the storage device 220 may perform the flush operation on write booster buffer based on a flush policy set in advance. Alternatively, when the device temperature TD is not included in the reference temperature range from TREF_d to TREF_u, the host device 210 may set various fields (e.g., fWriteBoosterBufferFlushEn or fWriteBooster-BufferFlushDuringHibernate) associated with the flush operation on write booster buffer based on a flush policy set in advance. For example, the storage device 220 may perform the flush operation on write booster buffer based on the set fields.

Figure 14:
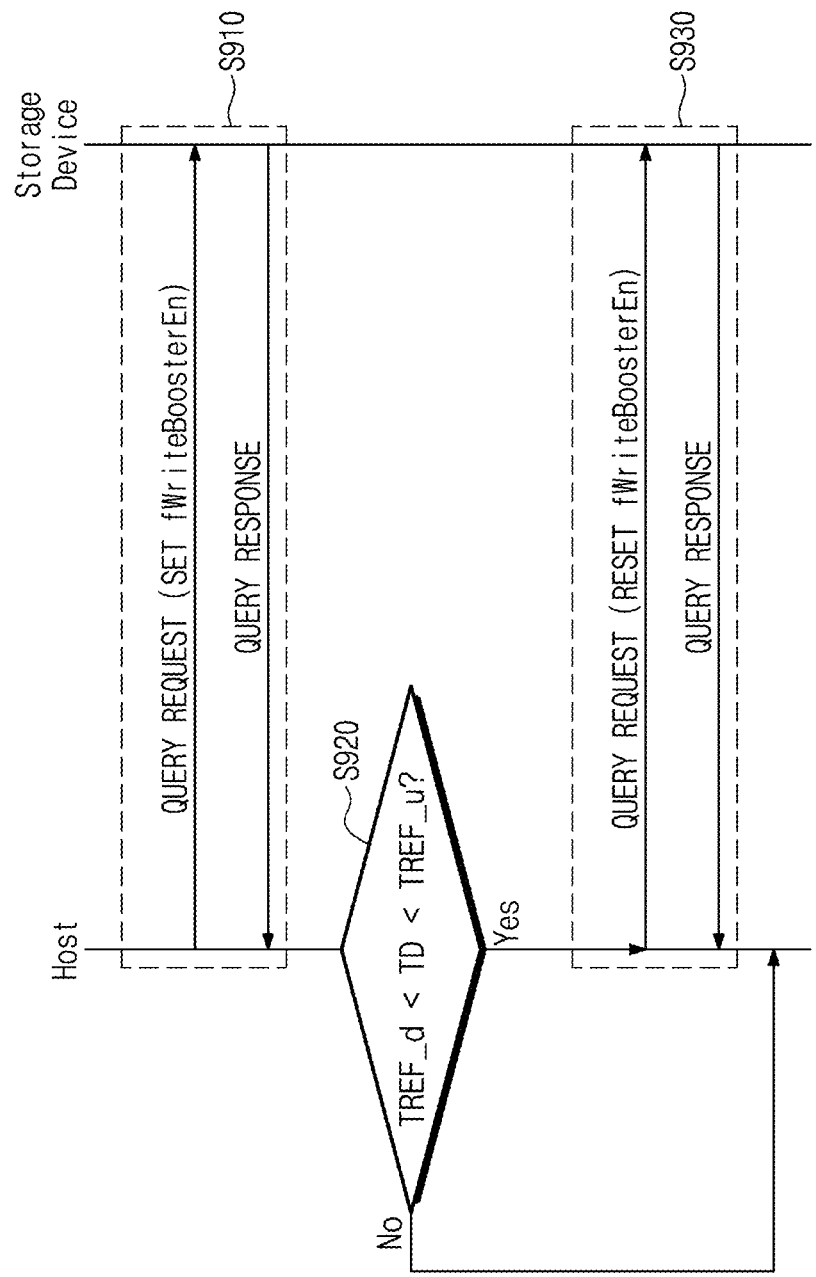
FIG. 14 is a flowchart illustrating an operation of a storage system of FIG. 11 according to some example embodiments.

FIG. 14 is a flowchart illustrating an operation of a storage system of FIG. 11 according to some example embodiments. Referring to FIGS. 11 and 14, in operation S910, the host device 210 may enable the write booster of the storage device 220. For example, the host device 210 may transmit the QUERY REQUEST for setting a value of the "fWriteBoosterEn" field of the FLAGS of the storage device 220 to an enable value (e.g., "1b") to the storage device 220. The storage device 220 may set the value of the "fWriteBoosterEn" field to the enable value (e.g., "1b") in response to the QUERY REQUEST. Afterwards, the storage device 220 may transmit the QUERY RESPONSE to the host device 210.

In some example embodiments, the storage device 220 may perform the write booster operation in response to that the value of the "fWriteBoosterEn" field is set to the enable value (e.g., "1b"). In some example embodiments, while the storage device 220 performs the write booster operation, the storage device 220 may perform flush operation on write booster buffer based on various policies (e.g., an explicit flush request, a flush during a hibernate state, and an internal flush policy).

In operation S920, the host device 210 may determine whether the device temperature TD is included in the reference temperature range from TREF_d to TREF_u.

When the device temperature TD is included in the reference temperature range from TREF_d to TREF_u, in operation S930, the host device 210 may disable the write booster of the storage device 220. For example, the host device 210 may transmit the QUERY REQUEST for setting a value of the "fWriteBoosterEn" field of the FLAGS of the storage device 220 to a disable value (e.g., "0b") to the storage device 220. The storage device 220 may set the value of the "fWriteBoosterEn" field to the disable value (e.g., "0b") in response to the QUERY REQUEST. Afterwards, the storage device 220 may transmit the QUERY RESPONSE to the host device 210.

In some example embodiments, in response to that the value of the "fWriteBoosterEn" field is set to the disable value (e.g., "0b"), the storage device 220 may perform the normal write operation without performing the write booster operation. Because the storage device 220 does not perform the write booster operation, the storage device 220 may not also perform the flush operation on write booster buffer.

When the device temperature TD is not included in the reference temperature range from TREF_d to TREF_u, the host device 210 may not perform a separate operation. For example, the storage device 220 may perform the write booster operation and the flush operation on write booster buffer. In some example embodiments, when the device temperature TD is not included in the reference temperature range from TREF_d to TREF_u, the host device 210 may again set the value of the "fWriteBoosterEn" field to the enable value. This may be implemented by again performing operation S910.

In some example embodiments, described with reference to FIGS. 11 to 14, based on the device temperature TD of the storage device 220, the host device 210 may selectively prohibit the flush operation on write booster buffer of the storage device 220 or may selectively disable the write booster of the storage device 220. For example, when the storage device 220 operates based on the specific user case, because the write booster operation is not performed and the normal write operation is performed, an unnecessary flush operation may be prevented. Accordingly, the lifetime of the storage device 220 or the nonvolatile memory device 222 may be improved.

In some example embodiments described with reference to FIGS. 11 to 14, the description is given as the host device 210 sets or resets various fields (e.g., fWriteBoosterEn, fWriteBoosterBufferFlushEn, and fWriteBoosterBufferFlushDuringHibernate) of the storage device 220, but example embodiments are not limited thereto. For example, the storage device 220 may include a dedicated field for selectively or temporarily prohibiting the flush operation on write booster buffer depending on the device temperature TD, and the host device 210 may control the dedicated field based on the above operations. In some example embodiments, the dedicated field may be at least one of various reserved fields of the storage device 220.

Figure 15:
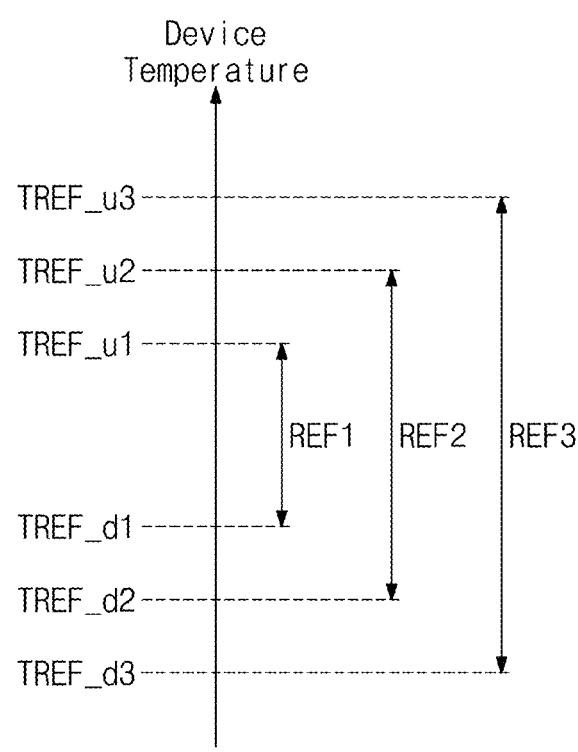
FIG. 15 is a diagram for describing a reference temperature range according to some example embodiments.

FIG. 15 is a diagram for describing a reference temperature range according to some example embodiments. In FIG. 15, a vertical axis represents a device temperature of the storage device 120. Referring to FIGS. 1 and 15, a reference temperature range may be variously set. For example, the reference temperature range may include first to third ranges REF1 to REF3 as illustrated in FIG. 15. The first range REF1 may be a range from a first lower reference temperature TREF_d1 to a first upper reference temperature TREF_u1, the second range REF2 may be a range from a second lower reference temperature TREF_d2 to a second upper reference temperature TREF_u2, and the third range REF3 may be a range from a third lower reference temperature TREF_d3 to a third upper reference temperature TREF_u3.

The third range REF3 may be wider than the second range REF2, and the second range REF2 may be wider than the first range REF1. In some example embodiments, as the range of the reference temperature ranges (e.g., REF1, REF2, and REF3) becomes wider, selective prohibition of the flush operation on write booster buffer may be made more frequently. For example, because the normal write operation is performed more frequently instead of the write booster operation as the range of the reference temperature range becomes wider, the lifetime of the storage device 120 may be further improved.

In contrast, according to some example embodiments, as the range of the reference temperature ranges (e.g., REF1, REF2, and REF3) becomes narrower, selective prohibition of the flush operation on write booster buffer may be made relatively less. For example, because the frequency that the normal write operation is performed instead of the write booster operation decreases as the range of the reference temperature range becomes narrower, the performance of the storage device 120 may be improved. As described above according to some example embodiments, the reference temperature range may be set to one of various ranges (e.g., REF1, REF2, or REF3) in consideration of the performance and the lifetime of the storage device 120.

In some example embodiments, the reference temperature range (e.g., REF1, REF2, or REF3) of the storage device 120 may be set or changed by the host device 110. In some example embodiments, the reference temperature range of the storage device 120 may be set as a ratio of an operating temperature range of the storage device 120. In some example embodiments, the ratio may be set by the host device 110.

As described above, according to some example embodiments, the reference temperature range of the storage device 120 may be variously set based on the performance, the lifetime, or the user case of the storage device 120.

Figure 16:
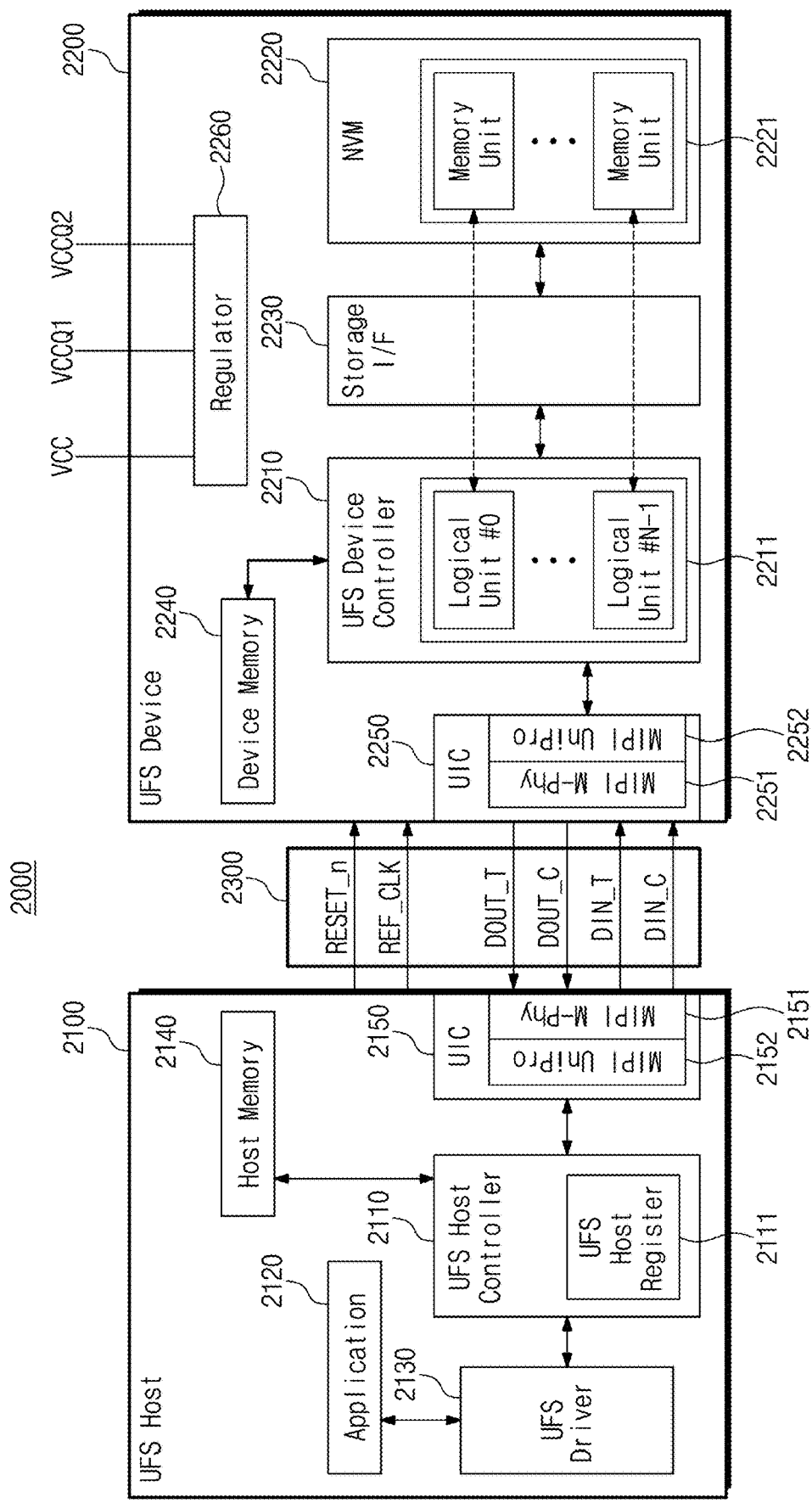
FIG. 16 is a diagram for describing an UFS system according to some example embodiments.

FIG. 16 is a diagram of a UFS system 2000 according to some example embodiments. The UFS system 2000 may be a system conforming to a UFS standard announced by Joint Electron Device Engineering Council (JEDEC) and may include a UFS host 2100, a UFS device 2200, and a UFS interface 2300. The above description of the system 1000 of FIG. 1 may also be applied to the UFS system 2000 of FIG. 16 within a range that does not conflict with the following description of FIG. 16.

Referring to FIG. 16, the UFS host 2100 may be connected to the UFS device 2200 through the UFS interface 2300. When the host device 110 of FIG. 1 is an application processor (AP), the UFS host 2100 may be implemented as a portion of the AP. The UFS host controller 2110 and the host memory 2140 may respectively correspond to a controller of the main processor 110 and memories of the main processor 110 of FIG. 1. The UFS device 2200 may correspond to the storage device 120 of FIG. 1, and a UFS device controller 2210 and an NVM 2220 may respectively correspond to the storage controller 121 and the NVM 122 of FIG. 1.

In some example embodiments, UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. In some example embodiments each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

In some example embodiments, the application 2120 may refer to processing circuitry such as hardware (e.g., logic circuits) or a combination of hardware and software (e.g., a computer-based electronic system like a processor executing instruction codes or program routines (e.g., a software program)) that may communicate with the UFS device 2200 to use functions of the UFS device 2200. For example, the application 2120 may transmit input-output requests (IORs) to the UFS driver 2130 for input/output (I/O) operations on the UFS device 2200. The IORs may refer to a data read request, a data storage (or write) request, and/or a data erase (or discard) request, but example embodiments are not limited thereto.

In some example embodiments, UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. According to some example embodiments, the UFS command may basically be defined by an SCSI standard, the UFS command may be a command dedicated to the UFS standard.

In some example embodiments, the UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

In some example embodiments, the UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252, but example embodiments are not limited thereto.

In some example embodiments, the UFS interface 2300 may include a line configured to transmit a reference clock signal REF_CLK, a line configured to transmit a hardware reset signal RESET_n for the UFS device 2200, a pair of lines configured to transmit a pair of differential input signals DIN_T and DIN_C, and a pair of lines configured to transmit a pair of differential output signals DOUT_T and DOUT_C, but example embodiments are not limited thereto.

In some example embodiments, a frequency of a reference clock signal REF_CLK provided from the UFS host 2100 to the UFS device 2200 may be one of 19.2 MHz, 26 MHz, 38.4 MHz, and 52 MHz, but example embodiments are not limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, in some example embodiments, the UFS host 2100 may set a data rate between the UFS host 2100 and the UFS device 2200 by using the frequency of the reference clock signal REF_CLK. For example, the data rate may be determined depending on the frequency of the reference clock signal REF_CLK.

In some example embodiments, the UFS interface 2300 may support a plurality of lanes, each of which may be implemented as a pair of differential lines. For example, the UFS interface 2300 may include at least one receiving lane and at least one transmission lane. In FIG. 16, for example, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 16, the number of transmission lanes and the number of receiving lanes may be changed.

In some example embodiments, the receiving lane and the transmission lane may transmit data based on a serial communication scheme. Full-duplex communications between the UFS host 2100 and the UFS device 2200 may be enabled due to a structure in which the receiving lane is separated from the transmission lane. For example, while receiving data from the UFS host 2100 through the receiving lane, the UFS device 2200 may transmit data to the UFS host 2100 through the transmission lane. In addition, in some example embodiments, control data (e.g., a command) from the UFS host 2100 to the UFS device 2200 and user data to be stored in or read from the NVM 2220 of the UFS device

2200 by the UFS host 2100 may be transmitted through the same lane. Accordingly, in some example embodiments, between the UFS host 2100 and the UFS device 2200, there may be no need to further provide a separate lane for data transmission in addition to a pair of receiving lanes and a pair of transmission lanes.

In some example embodiments, the UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, but example embodiments are not limited thereto. For example, the UFS device controller 2210 may include a plurality of LUs 2211, Logical Unit #0 to Logical Unit #N−1. In some example embodiments, the UFS device controller 2210 may include an FTL and convert a logical data address (e.g., a logical block address (LBA)) received from the UFS host 2100 into a physical data address (e.g., a physical block address (PBA)) by using address mapping information of the FTL. In some example embodiments, a logical block may be configured to store user data in the UFS system 2000 and may have a size in a predetermined range. For example, a minimum size of the logical block may be set to 4 Kbyte, but example embodiments are not limited thereto.

In some example embodiments, when a command from the UFS host 2100 is applied through the UIC layer 2250 to the UFS device 2200, the UFS device controller 2210 may perform an operation in response to the command and transmit a completion response to the UFS host 2100 when the operation is completed.

In some example embodiments, when the UFS host 2100 intends to store user data in the UFS device 2200, the UFS host 2100 may transmit a data storage command to the UFS device 2200. When a response (e.g., a 'ready-to-transfer' response) indicating that the UFS device 2200 is ready to receive user data (e.g., a 'ready-to-transfer' response) is received from the UFS device 2200 by the UFS host 2100, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

In some example embodiments, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine (not shown) embedded therein. For example, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, in some example embodiments, the UFS device controller 2210 may transmit user data, which is temporarily stored in the device memory 2240, to the UFS host 2100. In addition, in some example embodiments, the UFS device controller 2210 may further include an AES engine (not shown). The AES engine may perform at least an encryption operation and a decryption operation on data transmitted to the UFS device controller 2210 by using a symmetric-key algorithm.

In some example embodiments, the UFS host 2100 may sequentially store commands, which are to be transmitted to the UFS device 2200, in the UFS host register 2111, which may serve as a common queue (CQ), and sequentially transmit the commands to the UFS device 2200. For example, even while a previously transmitted command is still being processed by the UFS device 2200, that is, even before receiving a notification that the previously transmitted command has been processed by the UFS device 2200, the UFS host 2100 may transmit a next command, which is on standby in the UFS host register 2111 serving as the CQ, to the UFS device 2200. Thus, the UFS device 2200 may also receive a next command from the UFS host 2100 during the processing of the previously transmitted command. A maximum number (or queue depth) of commands that may be stored in the UFS host register 2111 serving as the CQ may be, for example, 32. Also, in some example embodiments, the CQ may be implemented as a circular queue in which a start and an end of a command line stored in a queue are indicated by a head pointer and a tail pointer.

In some example embodiments, each of the plurality of memory units 2221 may include a memory cell array (not shown) and a control circuit (not shown) configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

In some example embodiments, voltages VCC, VCCQ1, and VCCQ2 may be applied as power supply voltages to the UFS device 2200. The voltage VCC may be a main power supply voltage for the UFS device 2200 and be in a range of 2.4 V to 3.6 V. The voltage VCCQ1 may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ1, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

Figure 17A:
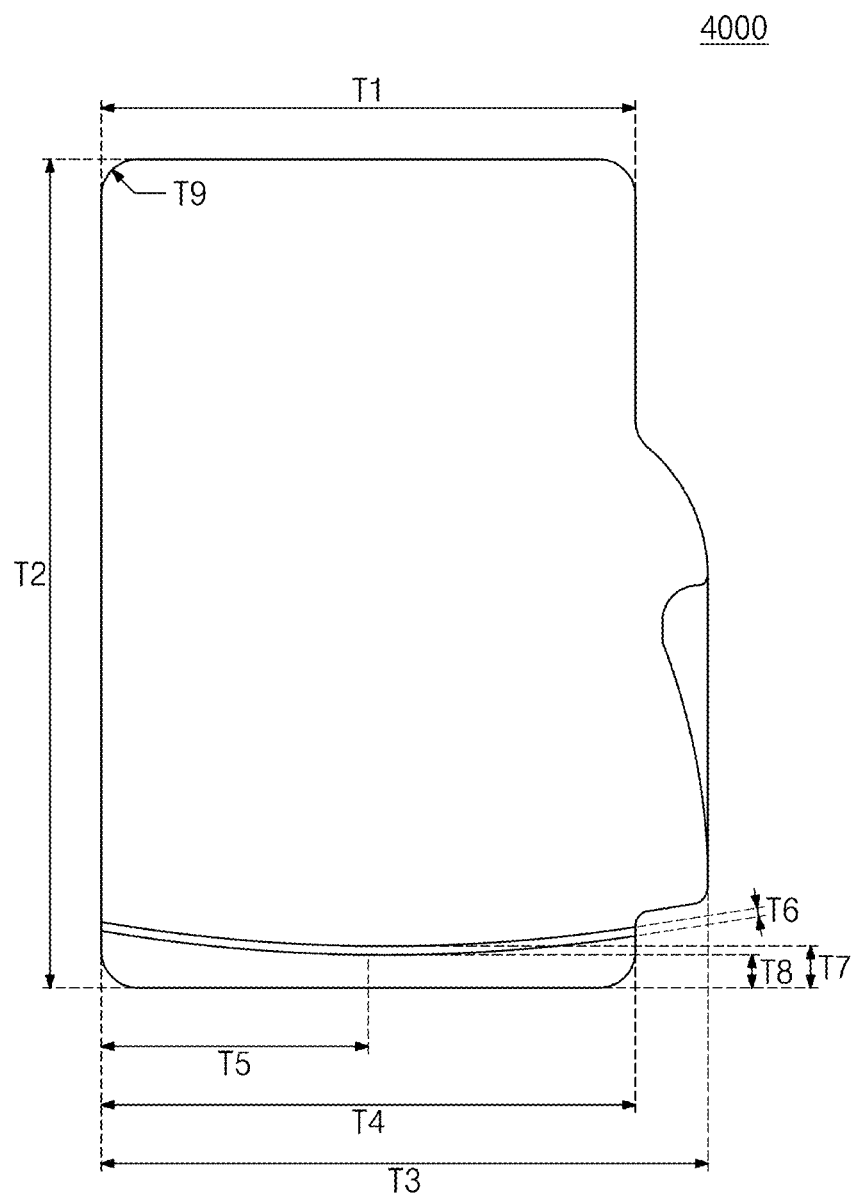

FIGS. 17A to 17C are diagrams of a form factor of a UFS card 4000 according to some example embodiments. When the UFS device 2200 described with reference to FIG. 16 is implemented as the UFS card 4000, an outer appearance of the UFS card 4000 may be as shown in FIGS. 17A to 17C.

FIG. 17A is a top view of the UFS card 4000, according to some example embodiments. Referring to FIG. 17A, the UFS card 4000 may entirely follow a shark-shaped design. In FIG. 17A, the UFS card 4000 may have dimensions shown in Table 1 below as an example.

TABLE 1

| Item | Dimension (mm) |
|---|---|
| T1 | 9.70 |
| T2 | 15.00 |
| T3 | 11.00 |

TABLE 1-continued

| Item | Dimension (mm) |
|---|---|
| T4 | 9.70 |
| T5 | 5.15 |
| T6 | 0.25 |
| T7 | 0.60 |
| T8 | 0.75 |
| T9 | R0.80 |

FIG. 17B is a side view of the UFS card 4000, according to some example embodiments. In FIG. 17B, the UFS card 4000 may have dimensions shown in Table 2 below as an example.

TABLE 2

| Item | Dimension (mm) |
|---|---|
| S1 | 0.74 ± 0.06 |
| S2 | 0.30 |
| S3 | 0.52 |
| S4 | 1.20 |
| S5 | 1.05 |
| S6 | 1.00 |

FIG. 17C is a bottom view of the UFS card 4000, according to some example embodiments. Referring to FIG. 17C, a plurality of pins for electrical contact with a UFS slot may be formed on a bottom surface of the UFS card 4000. Functions of each of the pins according to some example embodiments will be described below. Based on symmetry between a top surface and the bottom surface of the UFS card 4000, some pieces (e.g., T1 to T5 and T9) of information about the dimensions described with reference to FIG. 17A and Table 1 may also be applied to the bottom view of the UFS card 4000, which is shown in FIG. 17C.

In some example embodiments, a plurality of pins for an electrical connection with a UFS host may be formed on the bottom surface of the UFS card 4000. Referring to FIG. 17C, a total number of pins may be 12, but example embodiments are not limited thereto. Each of the pins may have a rectangular shape, and signal names corresponding to the pins may be as shown in FIG. 17C. Specific information, according to some example embodiments, about each of the pins will be understood with reference to Table 3 below and the above description presented with reference to FIG. 16.

TABLE 3

| No. | Signal Name | Description | Dimension (mm) |
|---|---|---|---|
| 1 | Vss | Ground (GND) | 3.00 × 0.72 ± 0.05 |
| 2 | DIN_C | Differential input signals input from a host to | 1.50 × 0.72 ± 0.05 |
| 3 | DIN_T | the UFS card 4000 (DIN_C is a negative node, and DIN_T is a positive node) | |
| 4 | Vss | Ground (GND) | 3.00 × 0.72 ± 0.05 |
| 5 | DOUT_C | Differential output signals output from the | 1.50 × 0.72 ± 0.05 |
| 6 | DOUT_T | UFS card 4000 to the host (DOUT_C is a negative node, and DOUT_T is a positive node) | |
| 7 | Vss | Ground (GND) | 3.00 × 0.72 ± 0.05 |
| 8 | REF_CLK | Reference clock signal provided from the host to the UFS card 4000 | 1.50 × 0.72 ± 0.05 |
| 9 | VCCQ2 | Power supply voltage provided mainly to a PHY interface or a controller and having a lower value than voltage Vcc | 3.00 × 0.72 ± 0.05 |
| 10 | C/D(GND) | Card detection signal | 1.50 × 0.72 ± 0.05 |
| 11 | Vss | Ground (GND) | 3.00 × 0.80 ± 0.05 |
| 12 | Vcc | Main power supply voltage | |

Figure 18:
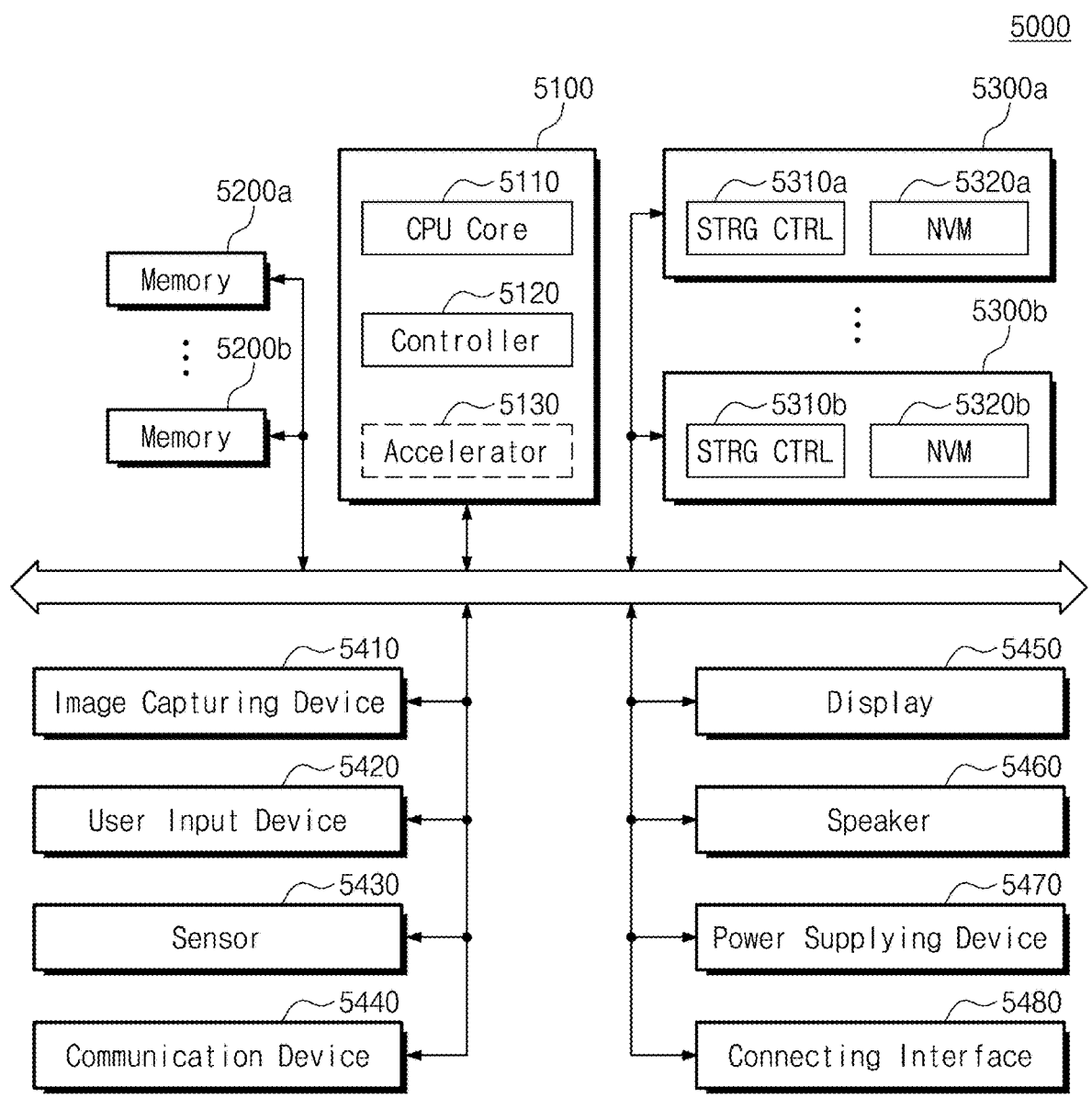
FIG. 18 is a diagram illustrating a system to which a storage device according to some example embodiments.

FIG. 18 is a diagram of a system 5000 to which a storage device is applied, according to some example embodiments. The system 5000 of FIG. 18 may basically be a mobile system, such as a portable communication terminal (e.g., a mobile phone), a smartphone, a tablet personal computer (PC), a wearable device, a healthcare device, or an Internet of things (IoT) device. However, the system 5000 of FIG. 18 is not limited to basically a mobile system, such as a portable communication terminal (e.g., a mobile phone), a smartphone, a tablet personal computer (PC), a wearable device, a healthcare device, or an Internet of things (IoT) device, and may be a PC, a laptop computer, a server, a media player, or an automotive device (e.g., a navigation device).

Referring to FIG. 18, in some example embodiments, the system 5000 may include a main processor 5100, memories (e.g., 5200a and 5200b), and storage devices (e.g., 5300a and 5300b). In addition, the system 5000 may include at least one of an image capturing device 5410, a user input device 5420, a sensor 5430, a communication device 5440, a display 5450, a speaker 5460, a power supplying device 5470, and a connecting interface 5480, but example embodiments are not limited thereto.

In some example embodiments, the main processor 5100 may control all operations of the system 5000, more specifically, operations of other components included in the system 5000. The main processor 5100 may be implemented as a general-purpose processor, a dedicated processor, or an application processor, but example embodiments are not limited thereto.

In some example embodiments, the main processor 5100 may include at least one CPU Core 5110 and further may include a controller 5120 configured to control memories 5200a and 5200b and/or the storage devices 5300a and 5300b. In some example embodiments, the main processor 5100 may further include an accelerator 5130, which is a dedicated circuit for a high-speed data operation, such as artificial intelligence (AI) data operation, but example embodiments are not limited thereto. The accelerator 5130 may include a graphics processing unit (GPU), a neural processing unit (NPU) and/or a data processing unit (DPU) and may be implemented as a chip that is physically separate from the other components of the main processor 5100.

In some example embodiments, memories 5200a and 5200b may be used as main memory devices of the system 5000. Although each of the memories 5200a and 5200b may include a volatile memory, such as static random access memory (SRAM) and/or dynamic RAM (DRAM), each of the memories 5200a and 5200b may alternatively include non-volatile memory, such as a flash memory, phase-change RAM (PRAM) and/or resistive RAM (RRAM). The memories 5200a and 5200b may be implemented in the same package as the main processor 5100.

In some example embodiments, the storage devices 5300a and 5300b may serve as non-volatile storage devices configured to store data regardless of whether power is supplied thereto, and have larger storage capacity than the memories 5200a and 5200b. The storage devices 5300a and 5300b may respectively include storage controllers (STRG CTRL) 5310a and 5310b and NVMs (Non-Volatile Memory) 5320a and 5320b configured to store data via the control of the storage controllers 5310a and 5310b. Although the NVMs 5320a and 5320b may include flash memories having a two-dimensional (2D) structure or a three-dimensional (3D) V-NAND structure, the NVMs 5320a and 5320b may include other types of NVMs, such as PRAM and/or RRAM.

In some example embodiments, the storage devices 5300a and 5300b may be physically separated from the main processor 5100 and may be included in the system 5000 or implemented in the same package as the main processor 5100. In addition, in some example embodiments, the storage devices 5300a and 5300b may have types of solid-state devices (SSDs) or memory cards and be removably combined with other components of the system 5000 through an interface, such as the connecting interface 5480 that will be described below. The storage devices 5300a and 5300b may be devices to which a standard protocol, such as a universal flash storage (UFS), an embedded multi-media card (eMMC), or a non-volatile memory express (NVMe), is applied, but example embodiments are not limited thereto.

In some example embodiments, the image capturing device 5410 may capture still images and/or moving images. The image capturing device 5410 may include a camera, a camcorder, and/or a webcam, but example embodiments are not limited thereto.

In some example embodiments, the user input device 5420 may receive various types of data input by a user of the system 5000 and include a touch pad, a keypad, a keyboard, a mouse, and/or a microphone, but example embodiments are not limited thereto.

In some example embodiments, the sensor 5430 may detect various types of physical quantities, which may be obtained from the outside of the system 5000, and convert the detected physical quantities into electric signals. The sensor 5430 may include a temperature sensor, a pressure sensor, an illuminance sensor, a position sensor, an acceleration sensor, a biosensor, and/or a gyroscope sensor, but example embodiments are not limited thereto.

In some example embodiments, the communication device 5440 may transmit and receive signals between other devices outside the system 5000 according to various communication protocols. The communication device 5440 may include an antenna, a transceiver, and/or a modem, but example embodiments are not limited thereto.

In some example embodiments, the display 5450 and the speaker 5460 may serve as output devices configured to respectively output visual information and auditory information to the user of the system 5000.

In some example embodiments, the power supplying device 5470 may appropriately convert power supplied from a battery (not shown) embedded in the system 5000 and/or an external power source, and supply the converted power to each of components of the system 5000.

In some example embodiments, the connecting interface 5480 may provide connection between the system 5000 and an external device, which is connected to the system 5000 and capable of transmitting and receiving data to and from the system 5000. The connecting interface 5480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface, but example embodiments are not limited thereto.

In some example embodiments, the storage devices 5300a and 5300b may be the storage device described with reference to FIGS. 1 to 17C, and the main processor 5100 may be the host device described with reference to FIGS. 1 to 17C. The storage devices 5300a and 5300b and the main processor 5100 may operate based on the methods described with reference to FIGS. 1 to 16.

According to some example embodiments of the inventive concepts, a storage device may selectively prohibit a flush operation on write booster buffer based on a device temperature. For example, in a specific user case where an idle time is relatively long, because a normal write operation is performed instead of a write booster operation, the number of times of a flush operation in the storage device may decrease. According to some example embodiments, storage devices with an improved lifetime, operation methods of the storage devices, and operation methods of host devices are provided.

As described herein, any devices, electronic devices, modules, models, units, and/or portions thereof may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphic processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, electronic devices, modules, units, and/or portions thereof according to any of the example embodiments.

While the inventive concepts have been shown and described with reference to some embodiments thereof, it will be understood that various changes in form and details may be made therein without departing from the spirit and scope of the following claims.

What is claimed is:

1. An operation method of a storage device which includes a write booster buffer and normal storage, the method comprising:
    writing first write data received from a host device in the write booster buffer; and
    selectively performing a flush operation on the write booster buffer, in which the first write data stored in the write booster buffer are flushed to the normal storage, based on a device temperature of the storage device,
    wherein memory cells included in the write booster buffer are configured to store "n" bits, "n" being a natural number,
    wherein memory cells included in the normal storage are configured to store "m" bits, "m" being a natural number greater than "n",
    wherein the flush operation on the write booster buffer is prohibited from being performed in response to the device temperature being higher than a first reference temperature and lower than a second reference temperature, and
    wherein the flush operation on the write booster buffer is performed based on a flush policy in response to the device temperature being lower than the first reference temperature or higher than the second reference temperature.

2. The method of claim 1, wherein a value of an "fWriteBoosterEn" field of FLAGS of the storage device is a first value corresponding to "enable".

3. The method of claim 2, further comprising:
    when the device temperature is higher than the first reference temperature and lower than the second reference temperature, writing second write data received from the host device in the normal storage.

4. The method of claim 2, wherein a value of an "fWriteBoosterBufferFlushDuringHibernate" field of the FLAGS of the storage device is the first value.

5. The method of claim 4, wherein the selectively performing of the flush operation on the write booster buffer includes:
    performing the flush operation on the write booster buffer when an available capacity of the write booster buffer is smaller than a reference value, the storage device is in a hibernate state, and the device temperature being lower than the first reference temperature or higher than the second reference temperature.

6. The method of claim 2, further comprising:
    when the device temperature is higher than the first reference temperature and lower than the second reference temperature, resetting the value of the "fWriteBoosterEn" field of the FLAGS to a second value corresponding to "disable".

7. The method of claim 1, wherein the selectively performing of the flush operation on the write booster buffer includes:
    receiving an explicit flush request from the host device;
    when the device temperature is lower than the first reference temperature or higher than the second reference temperature, performing the flush operation on the write booster buffer in response to receiving the explicit flush request; and
    when the device temperature is higher than the first reference temperature and lower than the second reference temperature, performing no flush operation on the write booster buffer.

8. The method of claim 1, wherein the device temperature is periodically measured.

9. The method of claim 1, wherein the storage device is a universal flash storage (UFS) device.

10. A storage device comprising:
    a nonvolatile memory device including a write booster buffer and normal storage;
    a storage controller configured to preferentially write first write data received from a host device in the write booster buffer; and
    a temperature sensor configured to periodically measure a device temperature of the storage device,
    wherein memory cells included in the write booster buffer are configured to store "n" bits, "n" being a natural number,
    wherein memory cells included in the normal storage are configured to store "m" bits, "m" being a natural number greater than "n",
    wherein, when the device temperature is within a reference temperature range, the storage controller is further configured to write second write data received from the host device in the normal storage,
    wherein the storage controller is configured to prohibit a flush operation on the write booster buffer from being performed in response to the device temperature being higher than a first reference temperature and lower than a second reference temperature, and
    wherein the storage controller is configured to perform the flush operation on the write booster buffer based on a flush policy in response to the device temperature being lower than the first reference temperature or higher than the second reference temperature.

11. The storage device of claim 10, wherein, when an available capacity of the write booster buffer is smaller than a reference value and the device temperature is lower than the first reference temperature or higher than the second reference temperature, the storage controller is configured to perform the flush operation on the write booster buffer, in which data stored in the write booster buffer are flushed to the normal storage.

12. The storage device of claim 11, wherein the storage controller performs the flush operation on the write booster buffer in a hibernate state.

13. The storage device of claim 11, wherein, while the device temperature is higher than the first reference temperature and lower than the second reference temperature, the available capacity of the write booster buffer maintains a state of being smaller than or equal to the reference value.

14. The storage device of claim 13, wherein, while the device temperature is higher than the first reference temperature and lower than the second reference temperature, the storage controller does not transmit information for "WRITEBOOSTER_FLUSH_NEEDED" to the host device.

15. The storage device of claim 10, wherein the storage controller is configured to:
    receive an explicit flush request from the host device; and
    perform the flush operation on the write booster buffer, in which data stored in the write booster buffer are flushed to the normal storage, in response to the explicit flush request.

16. The storage device of claim 15, wherein, when the device temperature is higher than the first reference temperature and lower than the second reference temperature, the storage controller does not perform the flush operation on the write booster buffer in response to the explicit flush request.

17. An operation method of a host device which is configured to control a universal flash storage (UFS) device, the method comprising:
- enabling a write booster of the UFS device;
- receiving a device temperature of the UFS device;
- when the device temperature is higher than a first reference temperature and lower than a second reference temperature, setting values of fields associated with a flush operation on a write booster buffer of the UFS device to a first value corresponding to "disable"; and
- when the device temperature is lower than the first reference temperature or higher than the second reference temperature, setting the values of the fields associated with the flush operation on the write booster buffer of the UFS device to a second value corresponding to "enable".

18. The method of claim 17, wherein, when the values of the fields associated with the flush operation on the write booster buffer of the UFS device are set to the first value, the UFS device does not perform the flush operation on the write booster buffer.

\* \* \* \* \*